(12) United States Patent
Ishizuka et al.

(10) Patent No.: US 7,499,637 B2
(45) Date of Patent: Mar. 3, 2009

(54) CAM MECHANISM OF A ZOOM LENS

(75) Inventors: Kazunori Ishizuka, Kanagawa (JP);
Toshiharu Suzuki, Saitama (JP)

(73) Assignee: Hoya Corporation, Tokyo (JP)

( * ) Notice: Subject to any disclaimer, the term of this patent is extended or adjusted under 35 U.S.C. 154(b) by 406 days.

(21) Appl. No.: 11/209,617

(22) Filed: Aug. 24, 2005

(65) Prior Publication Data

US 2006/0045503 A1    Mar. 2, 2006

(30) Foreign Application Priority Data

Aug. 31, 2004    (JP) .............................. 2004-253383

(51) Int. Cl.
*G03B 17/00*  (2006.01)
(52) U.S. Cl. .............................. 396/79; 396/85; 348/4; 348/208.6; 359/694; 359/699; 359/700; 359/701
(58) Field of Classification Search ................ 359/699, 359/700, 701, 694; 396/79, 85; 348/208.6, 348/211.9
See application file for complete search history.

(56) References Cited

U.S. PATENT DOCUMENTS

| 5,144,493 | A  | * | 9/1992  | Nomura ....................... 359/700 |
| 6,397,009 | B1 | * | 5/2002  | Ito et al. ....................... 396/79 |
| 6,490,099 | B2 |   | 12/2002 | Sasaki |
| 6,665,129 | B2 |   | 12/2003 | Nomura et al. |
| 7,242,535 | B2 | * | 7/2007  | Sato ........................... 359/700 |
| 2003/0081948 | A1 | * | 5/2003 | Nomura et al. ................ 396/72 |
| 2003/0156832 | A1 |   | 8/2003 | Nomura |
| 2004/0042089 | A1 |   | 3/2004 | Nomura |
| 2004/0042091 | A1 |   | 3/2004 | Nomura |
| 2004/0042777 | A1 |   | 3/2004 | Nomura |
| 2004/0051971 | A1 |   | 3/2004 | Nomura |

FOREIGN PATENT DOCUMENTS

JP          7-191249          7/1995
JP          10-282394         10/1998

OTHER PUBLICATIONS

English language Abstract of JP7-191249.

* cited by examiner

*Primary Examiner*—Melissa J Koval
*Assistant Examiner*—Michael A Strieb
(74) *Attorney, Agent, or Firm*—Greenblum & Bernstein, P.L.C.

(57) ABSTRACT

A cam mechanism of a zoom lens which includes a front optical element and a rear optical element positioned behind the front optical element in an optical axis direction, the front optical element and the rear optical element being guided linearly in the optical axis direction, the cam mechanism including a cam ring having a first cam groove, for moving the front optical element in the optical axis direction, and a second cam groove, for moving the rear optical element in the optical axis direction, both the first cam groove and the second cam groove being formed on one of an inner peripheral surface and an outer peripheral surface of the cam ring. The first cam groove is positioned behind the second cam groove in the optical axis direction.

13 Claims, 31 Drawing Sheets

CAM MECHANISM OF A ZOOM LENS

BACKGROUND OF THE INVENTION

1. Field of the Invention

The present invention relates to a zoom lens, more particularly to a cam mechanism, incorporated in the zoom lens, for moving optical elements such as lens groups.

2. Description of the Related Art

In conventional zoom lenses, it is often the case that a single cam ring incorporated therein is provided on an inner peripheral surface or an outer peripheral surface of the cam ring with two sets of cam grooves for moving two linearly guided optical elements (a front optical element and a rear optical element), e.g., two lens groups, respectively. Miniaturization of this type of cam ring sometimes requires the two sets of cam grooves to be formed to intersect each other, and accordingly, measures need to be taken in a zoom lens having such a cam ring to prevent the associated two sets of cam followers that are respectively engaged in the two sets of cam grooves from being disengaged therefrom at points of intersection of the two sets of cam grooves. As an example of a mechanism for preventing the cam followers from being disengaged from the associated cam grooves, a mechanism which includes auxiliary partial cam grooves and associated sub-cam followers for preventing disengagement of the two sets of cam followers from the two sets of cam grooves is known in the art, wherein the auxiliary partial cam grooves are provided independently of the two sets of cam grooves (main cam grooves) for guiding the associated cam followers, and the sub-cam followers are made to be engaged in the auxiliary partial cam grooves when the two sets of cam followers pass through the aforementioned points of intersection of the two sets of cam grooves. This type of mechanism is disclosed in, e.g., Japanese unexamined patent publication H10-282394.

However, taking such measures for the prevention of disengagement of each cam follower is liable to complicate the cam mechanism and increase the size thereof. Additionally, if the aforementioned two sets of cam grooves are formed on the cam ring to be isolated from each other in the optical axis direction so as not to intersect each other, the length of the cam ring becomes great to thereby make it difficult to miniaturize the zoom lens.

SUMMARY OF THE INVENTION

The present invention provides a cam mechanism of a lens barrel which includes a cam ring, wherein the cam ring is provided on a common peripheral surface thereof (either the inner peripheral surface or the outer peripheral surface of the cam ring) with at least one front cam groove and at least one rear cam groove that have different cam diagrams, and wherein miniaturization of the cam ring and simplification of the cam mechanism can be achieved at the same time.

According to an aspect of the present invention, a cam mechanism of a zoom lens is provided, which includes a front optical element and a rear optical element positioned behind the front optical element in an optical axis direction, the front optical element and the rear optical element being guided linearly in the optical axis direction, the cam mechanism including a cam ring having a first cam groove, for moving the front optical element in the optical axis direction, and a second cam groove, for moving the rear optical element in the optical axis direction, both the first cam groove and the second cam groove being formed on one of an inner peripheral surface and an outer peripheral surface of the cam ring. The first cam groove is positioned behind the second cam groove in the optical axis direction.

It is desirable for the first cam groove and the second cam groove to be formed on the inner peripheral surface of the cam ring, the cam mechanism further including a front optical element support frame and a rear optical element support frame which support the front optical element and the rear optical element, respectively, and are guided linearly in the optical axis direction; and a first cam follower and a second cam follower which are provided on the front optical element support frame and the rear optical element support frame are engaged in the first cam groove and the second cam groove, respectively.

It is desirable for one of the first cam groove and the second cam groove to include a front follower-insertion opening at a front end of the cam ring, and the other of the first cam groove and the second cam groove includes a rear follower-insertion opening at a rear end of the cam ring. One of the first cam follower and the second cam follower is formed integral with associated one of the front optical element support frame and the rear optical element support frame, and the other of the first cam follower and the second cam follower is formed as an element separate from associated the other of the front optical element support frame and the rear optical element support frame. During assembly of the zoom lens, the front optical element support frame and the rear optical element support frame are coupled to each other to be guided linearly in the optical axis direction relative to each other while the one of the first cam follower and the second cam follower, which is formed integral with associated one of the front optical element support frame and the rear optical element support frame, is inserted into associated one of the first cam groove and the second cam groove through associated one of the front follower-insertion opening and the rear follower-insertion opening, and subsequently the other of the first cam follower and the second cam follower is inserted into associated the other of the first cam groove and the second cam groove through associated the other of the front follower-insertion opening and the rear follower-insertion opening after being installed to the associated other of the front optical element support frame and the rear optical element support frame.

It is desirable for the front optical element support frame and the rear optical element support frame to include a front linear guide portion and a rear linear guide portion, respectively, which are configured to guide the front optical element support frame and the rear optical element support frame linearly in the optical axis direction relative to each other, one of the front optical element support frame and the rear optical element support frame being guided linearly in the optical axis direction by a linear guide member provided independently of each of the front optical element support frame and the rear optical element support frame.

It is desirable for the front optical element support frame and the rear optical element support frame to include a front ring portion and a rear ring portion, respectively, which support the front optical element and the rear optical element, respectively, and which are positioned away from each other in the optical axis direction. The front linear guide portion and the rear linear guide portion include at least one rearward projection and at least one forward projection, respectively, which project in directions approaching each other in the optical axis direction.

It is desirable for the one of the first cam groove and the second cam groove, into which the one of the first cam follower and the second cam follower that is formed integral with the associated one of the front optical element support frame and the rear optical element support frame is inserted, includes a lens-barrel assembling section which is formed so as to be communicatively connected with the associated one of the front follower-insertion opening and the rear follower-insertion opening and aligned therewith in the optical axis direction. When the one of the first cam follower and the second cam follower, which is formed integral with the associated one of the front optical element support frame and the rear optical element support frame, is in the lens-barrel assembling section, the other of the first cam follower and the second cam follower is exposed radially outwards from the cam ring.

It is desirable for the cam ring includes at least one cutout portion through which the other of the first cam follower and the second cam follower is exposed radially outwards from the cam ring when the one of the first cam follower and the second cam follower is in the lens-barrel assembling section.

It is desirable for positions of the first cam follower and the second cam follower in a circumferential direction of the cam ring to be mutually different when the first cam follower and the second cam follower are engaged in the first cam groove and the second cam groove, respectively.

It is desirable for the first cam groove to include at least two first cam grooves arranged at different positions in a circumferential direction of the cam ring. The second cam groove includes at least two second cam grooves arranged at different positions in the circumferential direction of the cam ring. Each of the two first cam grooves and the two second cam grooves does not intersect any other cam groove of the two first cam grooves and the two second cam grooves.

It is desirable for the front optical element and the rear optical element to include a second lens group and a third lens group, respectively, of a photographing optical system of the zoom lens.

It is desirable for the first cam groove and the second cam groove to be formed on one of the inner peripheral surface and the outer peripheral surface of the cam ring. The zoom lens further includes a frontmost optical element positioned in front of the front optical element in the optical axis direction. A third cam groove for moving the frontmost optical element in the optical axis direction is formed on the other of the inner peripheral surface and the outer peripheral surface of the cam ring.

It is desirable for one and the other of the first cam groove and the second cam groove to have a substantially V-shaped cam groove and a substantially inverted V-shaped cam groove, respectively.

In an embodiment, a lens system is provided, including a front optical element and a rear optical element which are guided linearly in the optical axis direction. The lens system includes a cam mechanism for moving the front optical element and the rear optical element in the optical axis direction while changing a distance therebetween in a predetermined moving manner. The cam mechanism includes a cam ring having a first cam groove for moving the front optical element in the optical axis direction and a second cam groove for moving the rear optical element in the optical axis direction, both the first cam groove and the second cam groove being formed on one of an inner peripheral surface and an outer peripheral surface of the cam ring. The first cam groove is positioned behind the second cam groove in the optical axis direction.

According to the present invention, miniaturization of the cam ring and simplification of the cam mechanism are achieved at the same time in a cam mechanism of a lens barrel which includes a cam ring provided on a common peripheral surface thereof with a front cam groove and a rear cam groove that have different cam diagrams.

The present disclosure relates to subject matter contained in Japanese Patent Application No. 2004-253383 (filed on Aug. 31, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
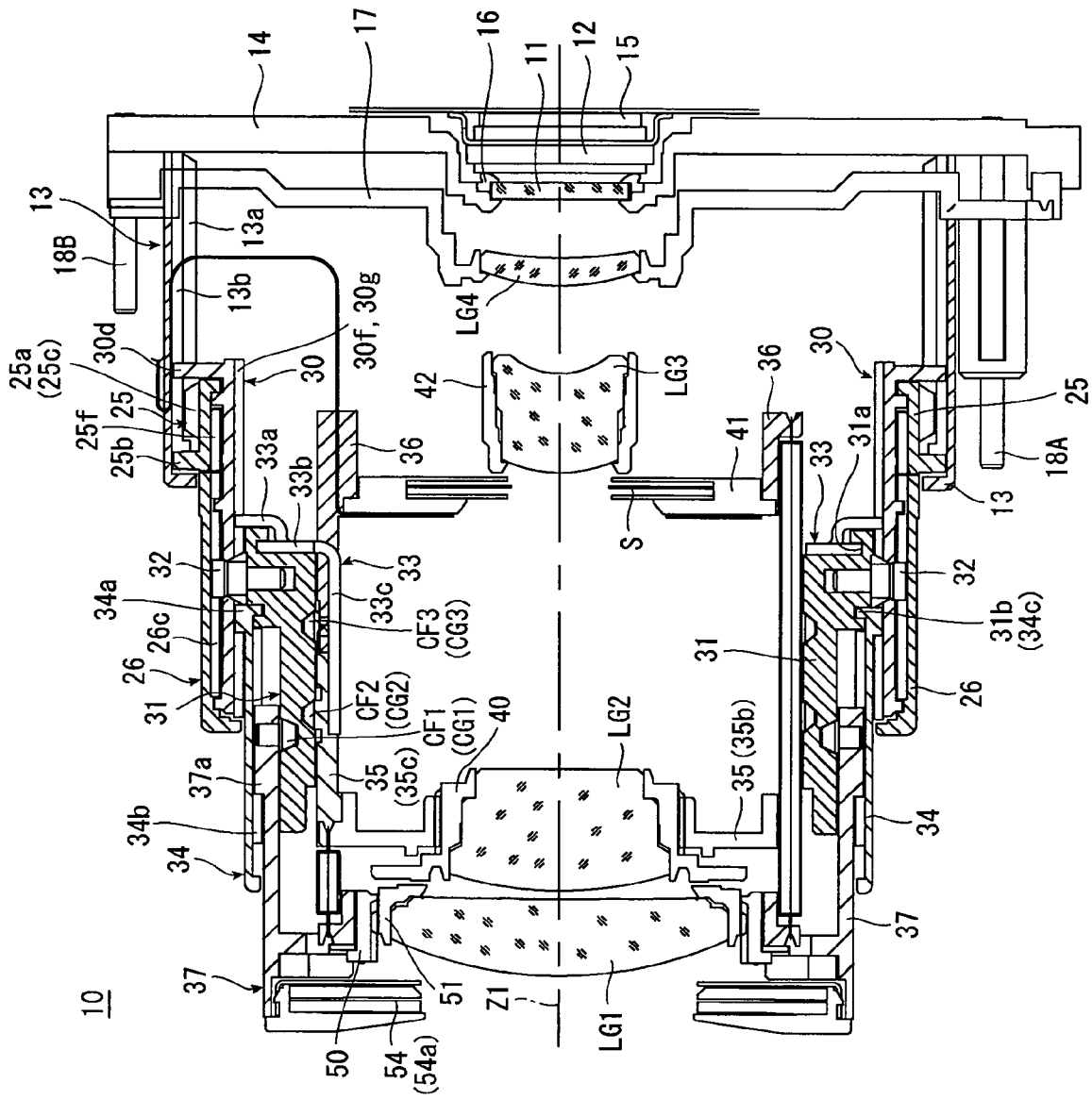
FIG. 1 is a longitudinal sectional view of an embodiment of a zoom lens according to the present invention at the wide-angle extremity.
Figure 2:
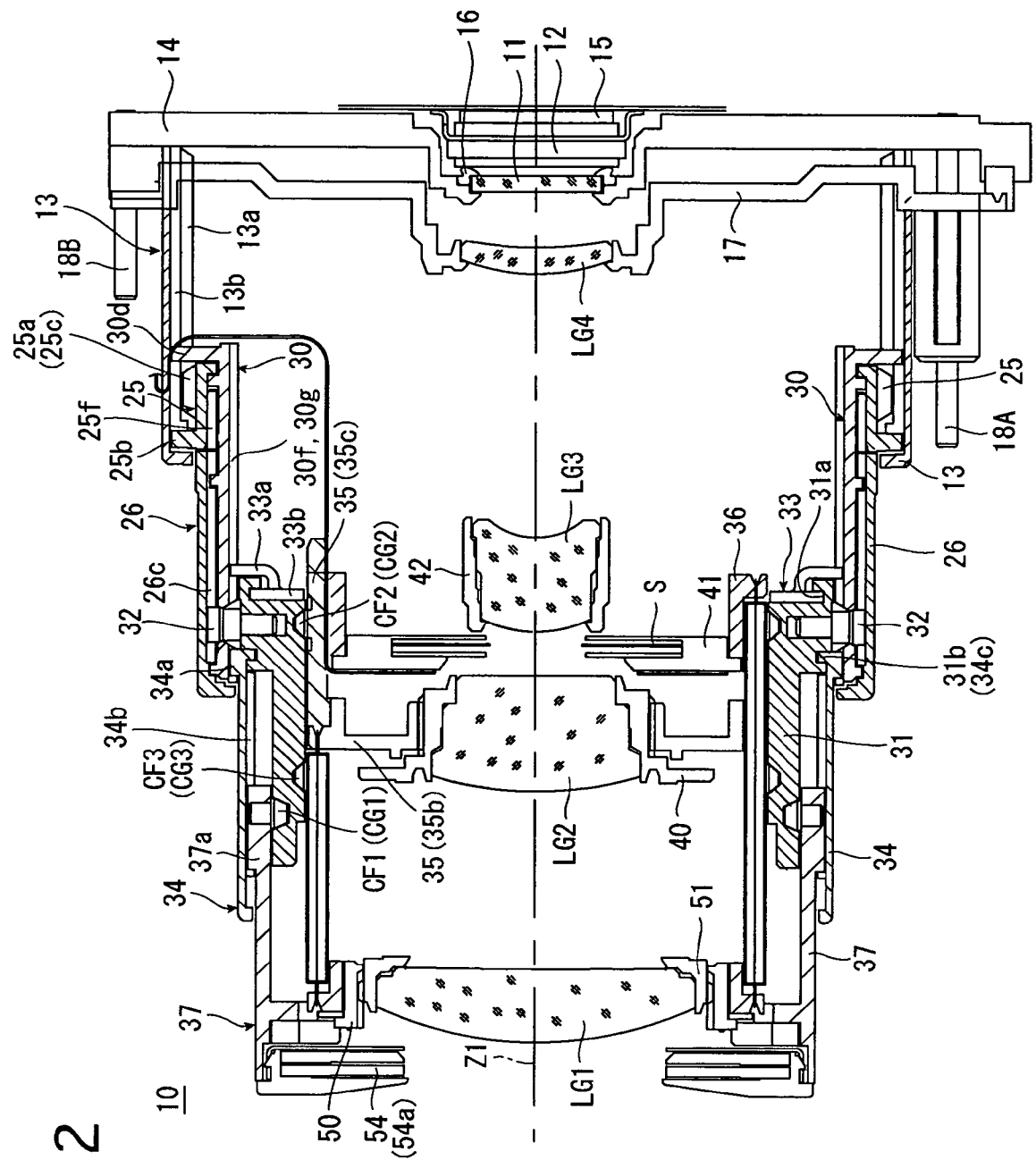
FIG. 2 is a longitudinal sectional view of the zoom lens shown in FIG. 1 at the telephoto extremity.
Figure 3:
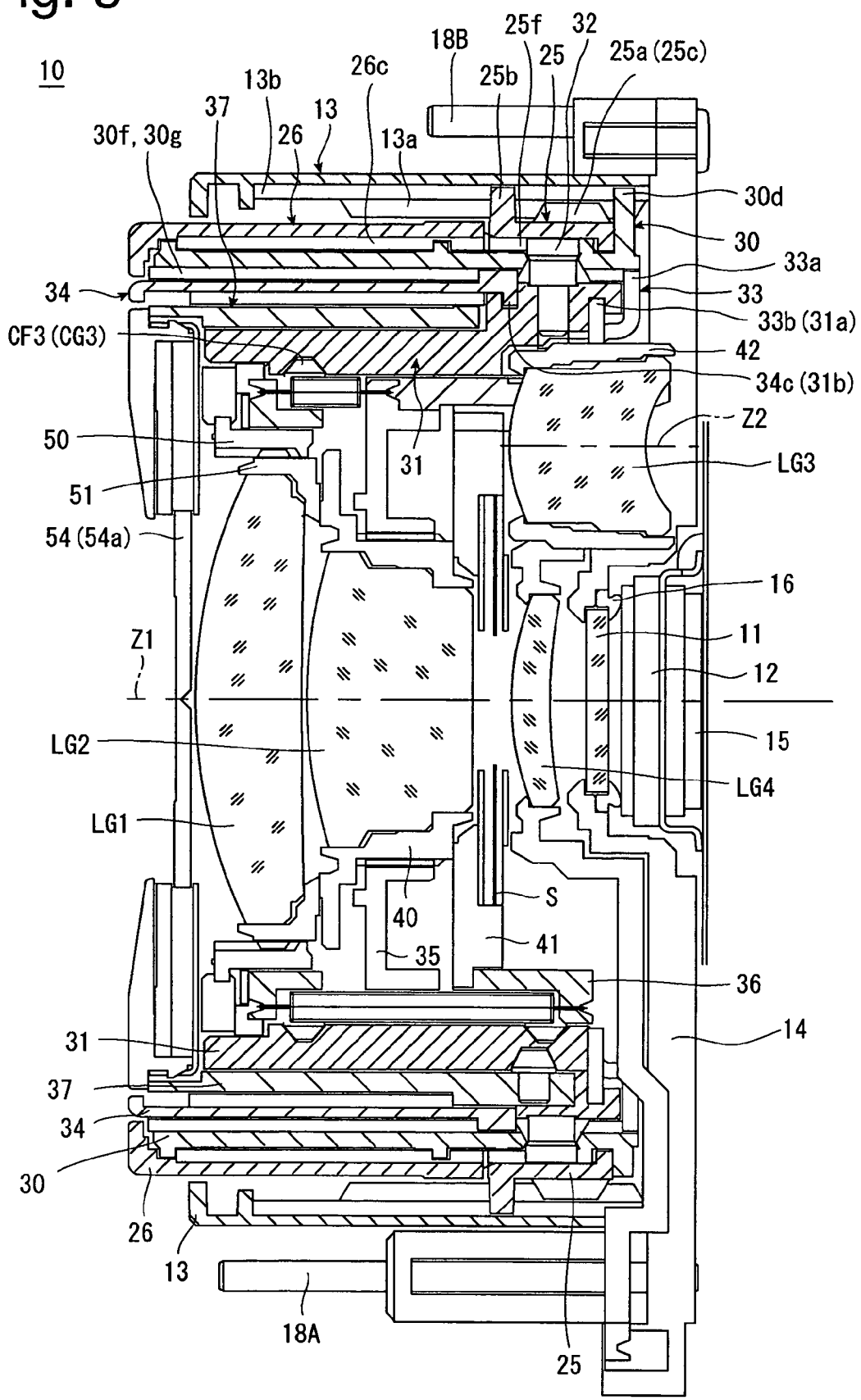
FIG. 3 is a longitudinal sectional view of the zoom lens shown in FIG. 1 in the accommodated state (fully-retracted state) thereof.

FIGS. 1 through 3 show an embodiment of a zoom lens according to the present invention in different states. FIG. 1 shows a state of the zoom lens 10 at the wide-angle extremity, FIG. 2 shows a state of the zoom lens 10 at the telephoto extremity, and FIG. 3 shows a state of the zoom lens in a retracted position (fully retracted position). The zoom lens 10 is incorporated in a digital camera (the camera body thereof is not shown in the drawings). As shown in FIGS. 1 and 2, the photographing optical system of the zoom lens 10 in a ready-to-photograph state of the zoom lens 10 consists of a first lens group LG1, a second lens group (front optical element) LG2, a shutter S, a third lens group (rear optical element) LG3, a fourth lens group LG4, a low-pass filter (optical filter) 11, and a CCD image sensor (solid-state image pick-up device) 12. The first lens group LG1, the second lens group LG2 and the third lens group LG3 are driven along a photographing optical axis Z1 in a predetermined moving manner to perform a zooming operation, while the fourth lens group L4 is driven along the photographing optical axis Z1 to perform a focusing operation. In the following description, the term "optical axis direction" refers to a direction parallel to the photographing optical axis Z1 unless otherwise stated.

Figure 4:
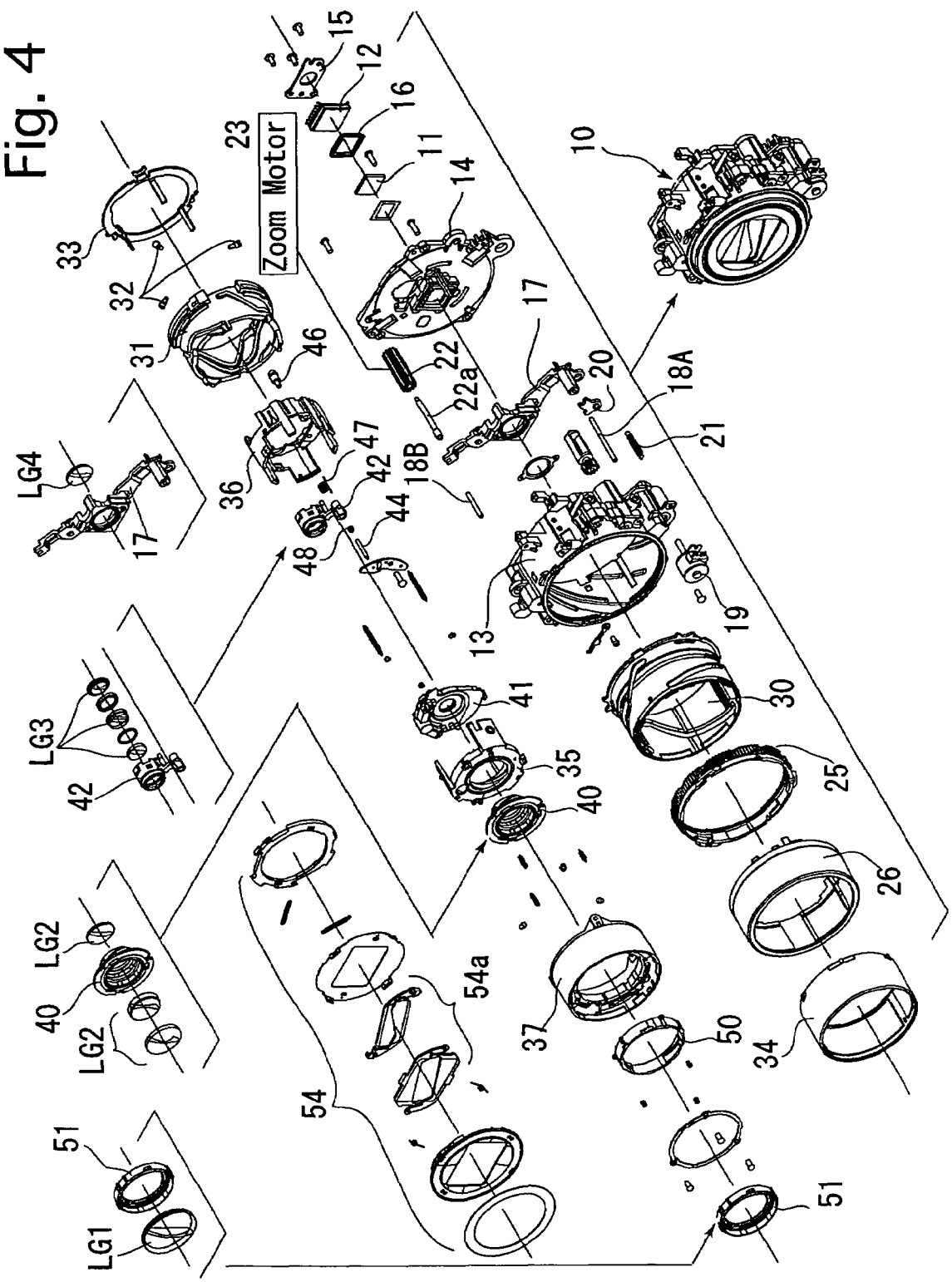
FIG. 4 is an exploded perspective view of elements of the zoom lens shown in FIGS. 1 through 3.

FIG. 4 is an exploded view of elements of the zoom lens 10, and FIGS. 5 through 12 are enlarged views of these elements. The zoom lens 10 is incorporated in a camera body (not shown), and is provided with a stationary barrel 13 fixed to the camera body. A CCD holder (stationary member) 14 is fixed to a rear portion of the stationary barrel 13 from behind. The CCD image sensor 12 is mounted to a central portion of the CCD holder 14 to be held thereby via a CCD base plate 15. The low-pass filter 11 is held by the CCD holder 14 to be positioned in front of the CCD image sensor 12. An annular sealing member 16 is installed between the lower-pass filter 11 and the CCD image sensor 12 to seal the gap therebetween.

The zoom lens 10 is provided in the stationary barrel 13 with an AF lens frame (a fourth lens frame which supports and holds the fourth lens group LG4) 17 which is guided linearly in the optical axis direction without rotating about the photographing optical axis Z1. Specifically, the zoom lens 10 is provided with a pair of AF guide shafts 18A and 18B which extend parallel to the photographing optical axis Z1 to guide the AF lens frame 17 in the optical axis direction without rotating the AF lens frame 17 about the photographing optical axis Z1. Front and rear ends of each guide shaft of the pair of AF guide shafts 18A and 18B are fixed to the stationary barrel 13 and the CCD holder 14, respectively. The AF lens frame 17 is provided on radially opposite sides thereof with a pair of guide holes (guide grooves) in which the pair of AF guide shafts 18A and 18B are respectively fitted so that the AF lens frame 17 is slidable on the pair of AF guide shafts 18A and 18B. Portions of the stationary barrel 13 and the CCD holder 14 which support the pair of AF guide shafts 18A and 18B project radially outwards from the outside diameter of the stationary barrel 13, and accordingly, the pair of AF guide shafts 18A and 18B are positioned radially outside of the stationary barrel 13.

The zoom lens 10 is provided therein with an AF motor 19 which is fixed to the stationary barrel 13. The AF lens frame 17 can be moved forward and rearward in the optical axis direction by a driving force of the AF motor 19. A rotary drive shaft of the AF motor 19 is threaded to serve as a feed screw shaft (rotatable lead screw), and this rotary drive shaft is screwed through a female screw hole formed on an AF nut 20 (see FIG. 5). The AF lens frame 17 is engaged with the AF nut 20 to be slidable thereon in the optical axis direction, and is biased forward in the optical axis direction by an extension coil spring (biasing member) 21, and the forward movement limit of the AF lens frame 17 is determined via the engagement between surfaces of the AF nut 20 and the AF lens frame 17 which are opposed to each other in the optical axis direction. A rearward movement of the AF nut 20 in the optical axis direction by a rotation of the rotary drive shaft of the AF motor 19 causes the AF lens frame 17 to be pressed rearward by the AF nut 20 to be moved rearward against the biasing force of the extension coil spring 21. Due to this structure, rotating the rotary drive shaft of AF motor 19 forward and rearward causes the AF lens frame 17 to move forward and rearward in the optical axis direction.

The zoom lens 10 is provided with a zoom gear 22 which is supported by the stationary barrel 13 to be rotatable on a zoom gear shaft 22a extending parallel to the photographing optical axis Z1. Front and rear ends of the zoom gear shaft 22a are fixed to the stationary barrel 13 and the CCD holder 14, respectively. The zoom gear 22 is positioned so that the gear teeth thereof partly project radially inwards from an inner peripheral surface of the stationary barrel 13, and can be rotated forward and reverse by a zoom motor 23 (shown conceptually by a labeled rectangle in FIG. 4).

Figure 5:
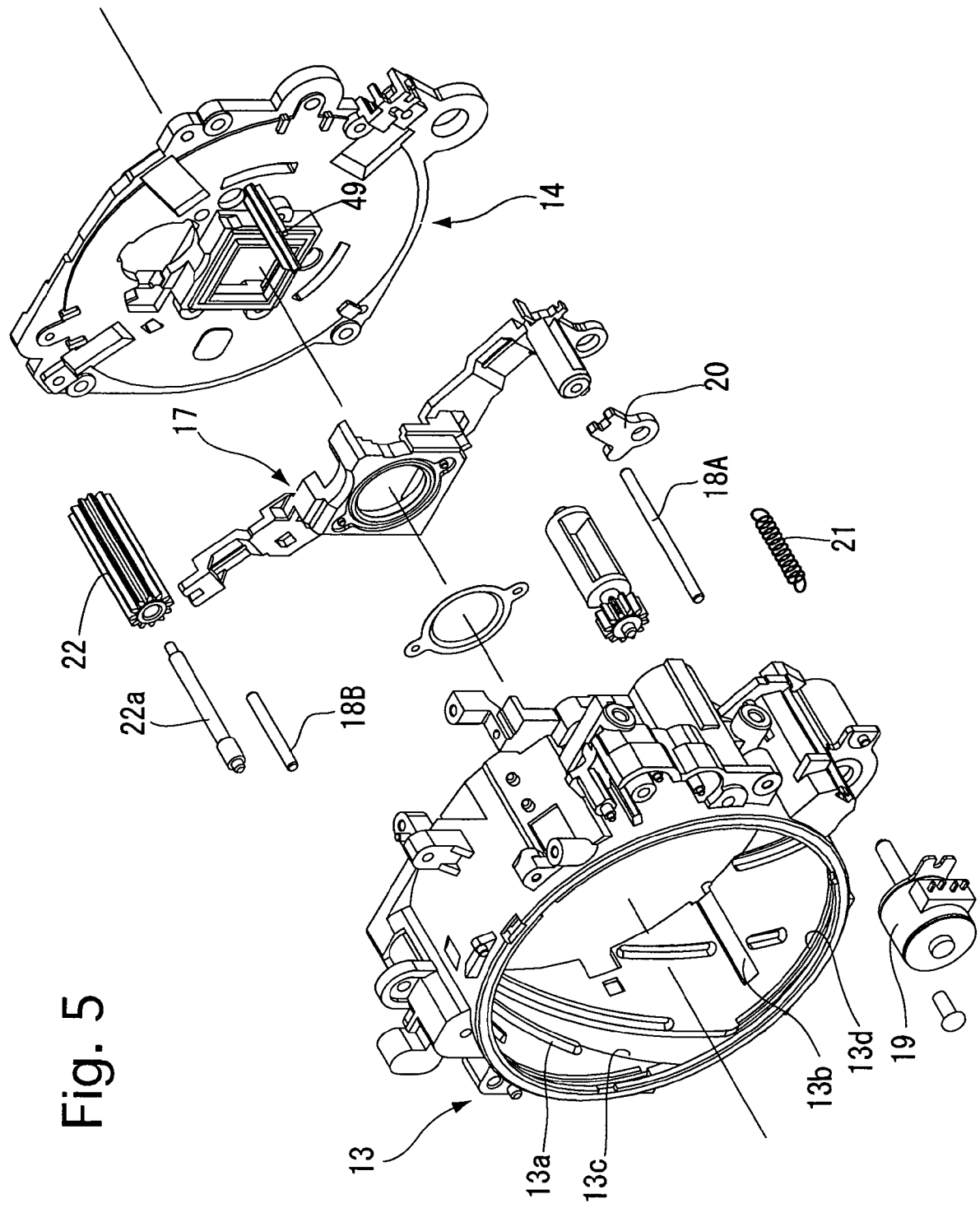
FIG. 5 is an exploded perspective view of a CCD holder, a stationary barrel and other elements of the zoom lens shown in FIGS. 1 through 3.

As shown in FIG. 5, the stationary barrel 13 is provided on an inner peripheral surface thereof with a female helicoid 13a, a set of three linear guide grooves 13b, a set of three inclined grooves 13c, and a set of three rotational guide grooves 13d. Threads of the female helicoid 13a extend in a direction inclined with respect to both the optical axis direction and a circumferential direction of the stationary barrel 13. The set of three linear guide grooves 13b extend parallel to the photographing optical axis Z1. The set of three inclined grooves 13c extend parallel to the female helicoid 13a. The set of three rotational guide grooves 13d are formed in the vicinity of a front end of the inner peripheral surface of the stationary barrel 13 to extend along a circumference of the stationary barrel 13 to communicate the front ends of the set of three inclined grooves 13c, respectively. The female helicoid 13a is not formed on a specific front area of the inner peripheral surface of the stationary barrel 13 which is positioned immediately behind the set of three rotational guide grooves 13d. Regarding each set of the above three sets of grooves (the set of three linear guide grooves 13b, the set of three inclined grooves 13c and the set of three rotational guide grooves 13d), although each set of grooves is composed of three grooves which are arranged at different circumferential positions on the inner peripheral surface of the stationary lens barrel 13, only some of the three grooves appear in FIG. 5.

Figure 6:
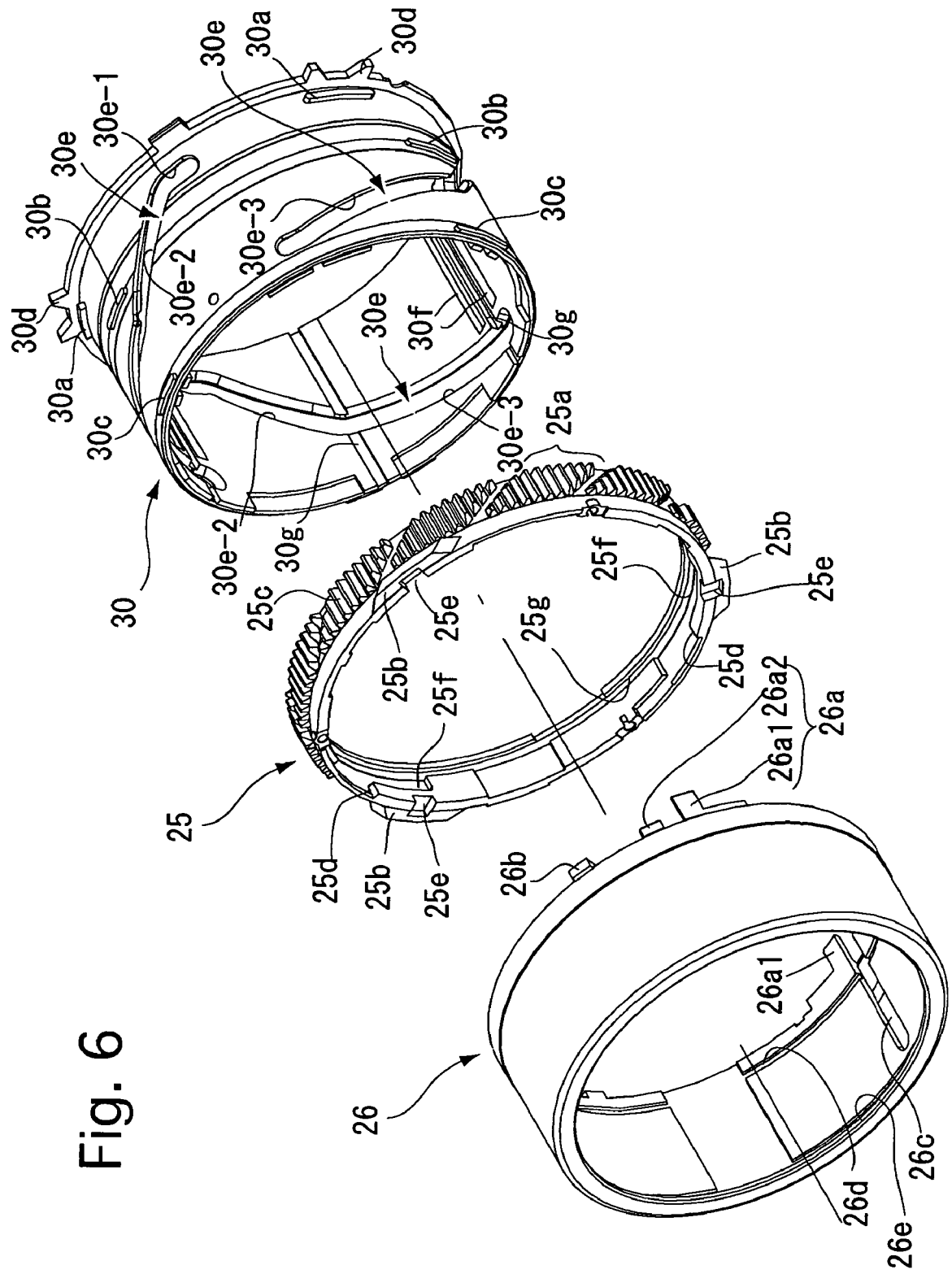
FIG. 6 is an exploded perspective view of a first linear guide ring, a helicoid ring and a third external barrel of the zoom lens shown in FIGS. 1 through 3.
Figure 7:
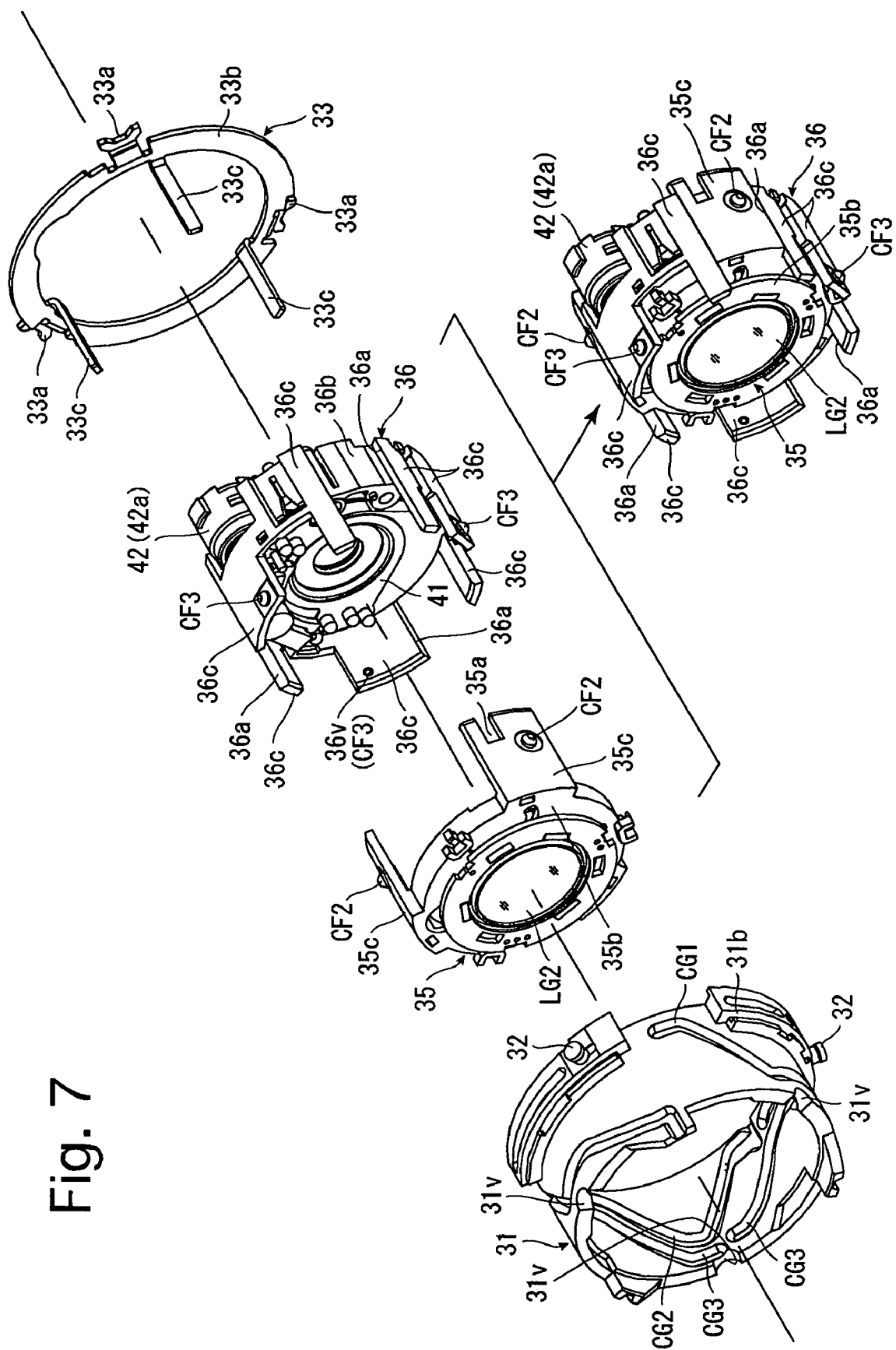
FIG. 7 is an exploded perspective view of a cam ring, a second linear guide ring, a second lens group moving frame and a third lens group moving frame which are shown in FIG. 4.
Figure 8:
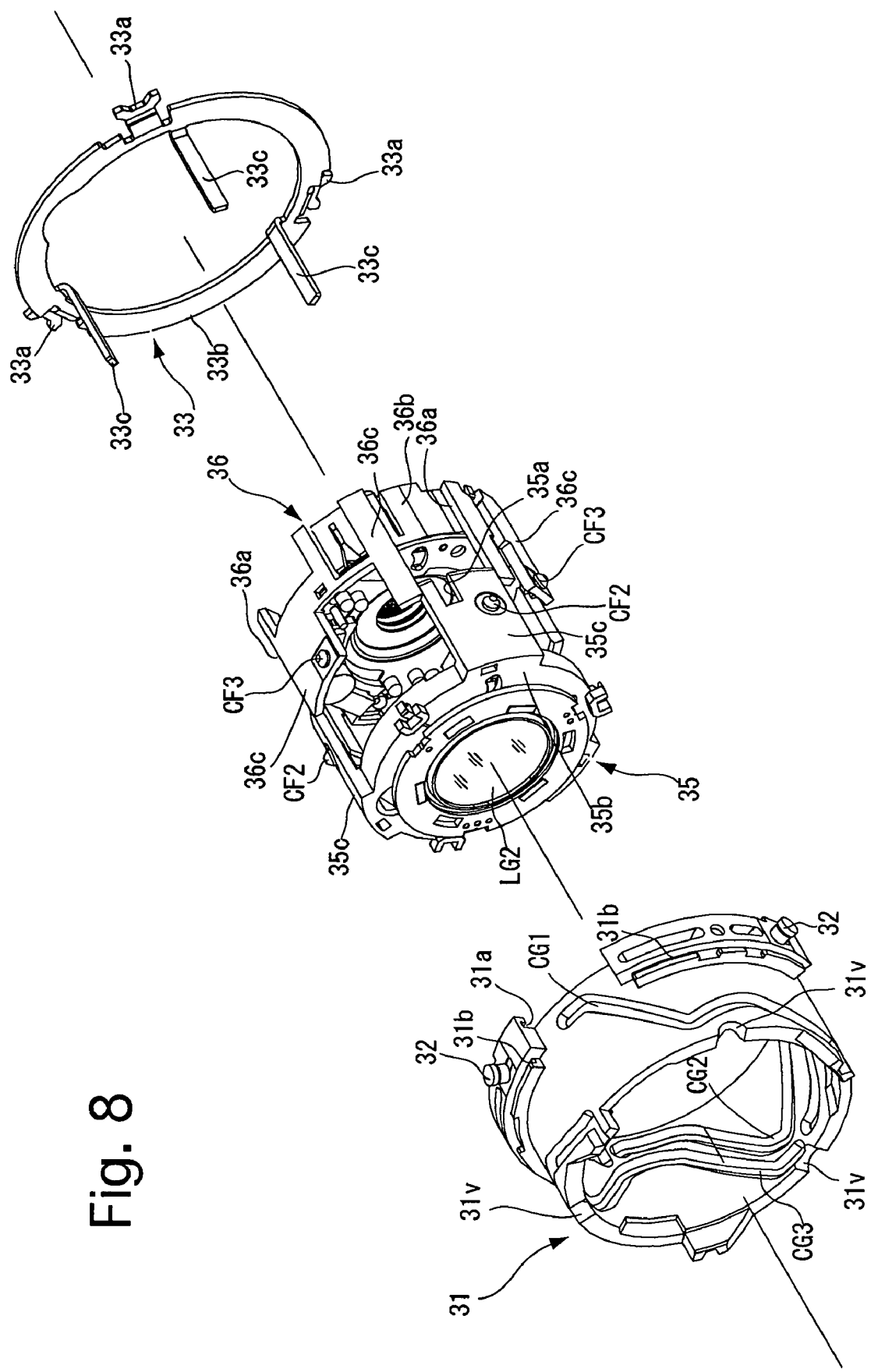
FIG. 8 is an exploded perspective view of the cam ring, the second linear guide ring, the second lens group moving frame and the third lens group moving frame of the zoom lens shown in FIGS. 4 and 7, showing the relative position between the second lens group moving frame and the third lens group moving frame at the wide-angle extremity of the zoom lens.
Figure 9:
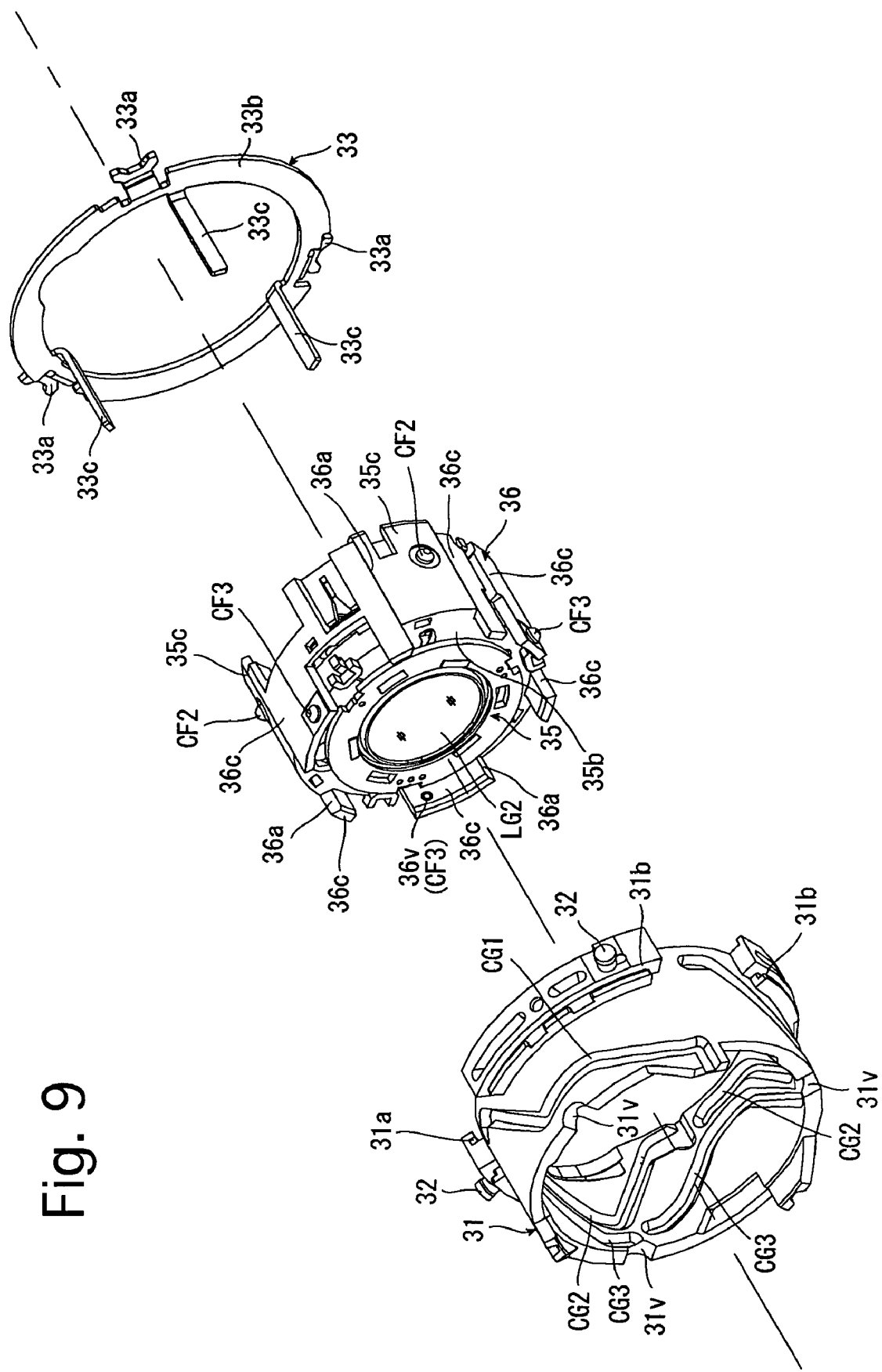
FIG. 9 is an exploded perspective view of the cam ring, the second linear guide ring, the second lens group moving frame and the third lens group moving frame of the zoom lens shown in FIGS. 4 and 7, showing the relative position between the second lens group moving frame and the third lens group moving frame at the telephoto extremity of the zoom lens.
Figure 10:
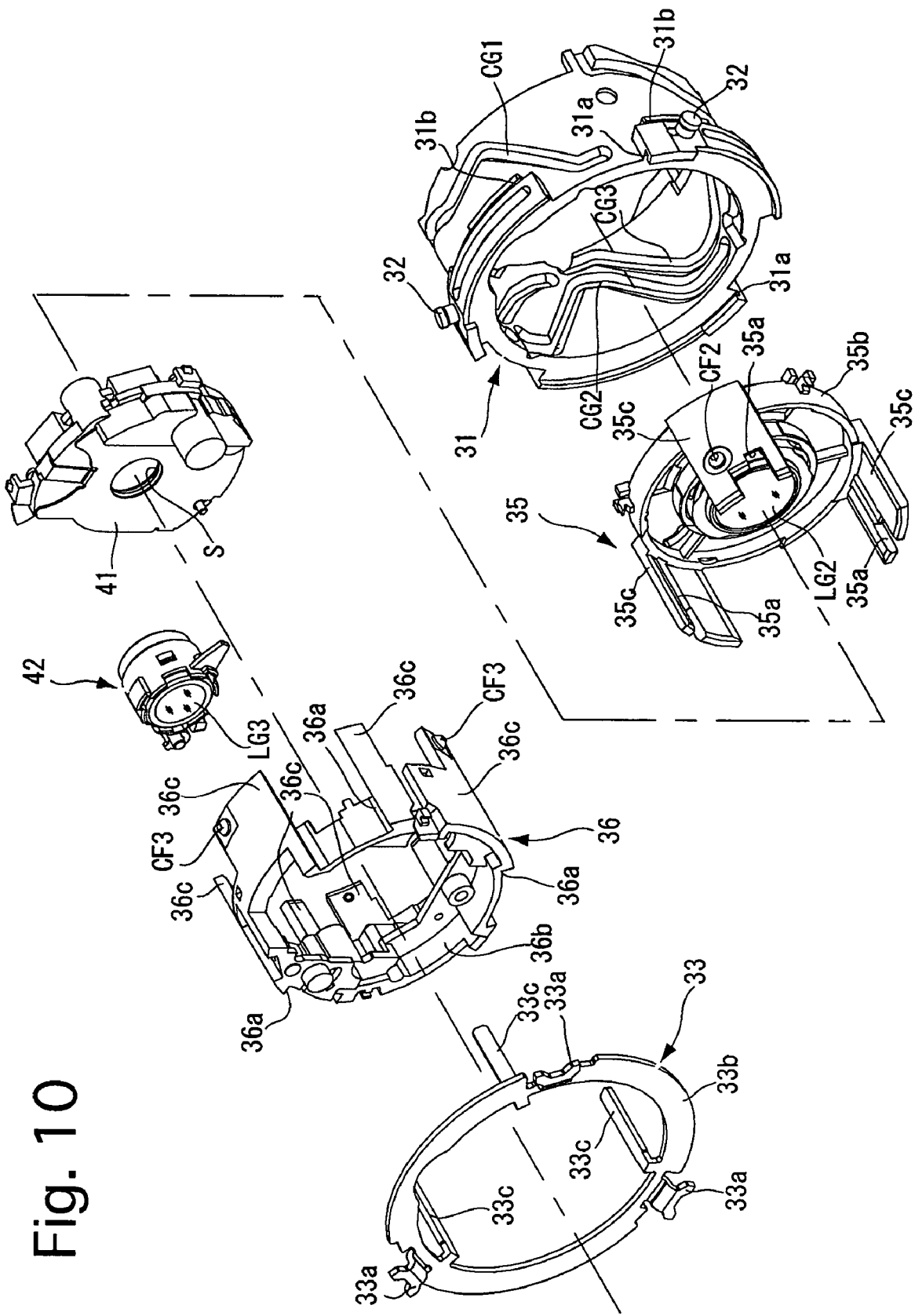
FIG. 10 is an exploded perspective view of the cam ring, the second linear guide ring, the second lens group moving frame and the third lens group moving frame, viewed from a side different from the side shown in FIG. 7.
Figure 11:
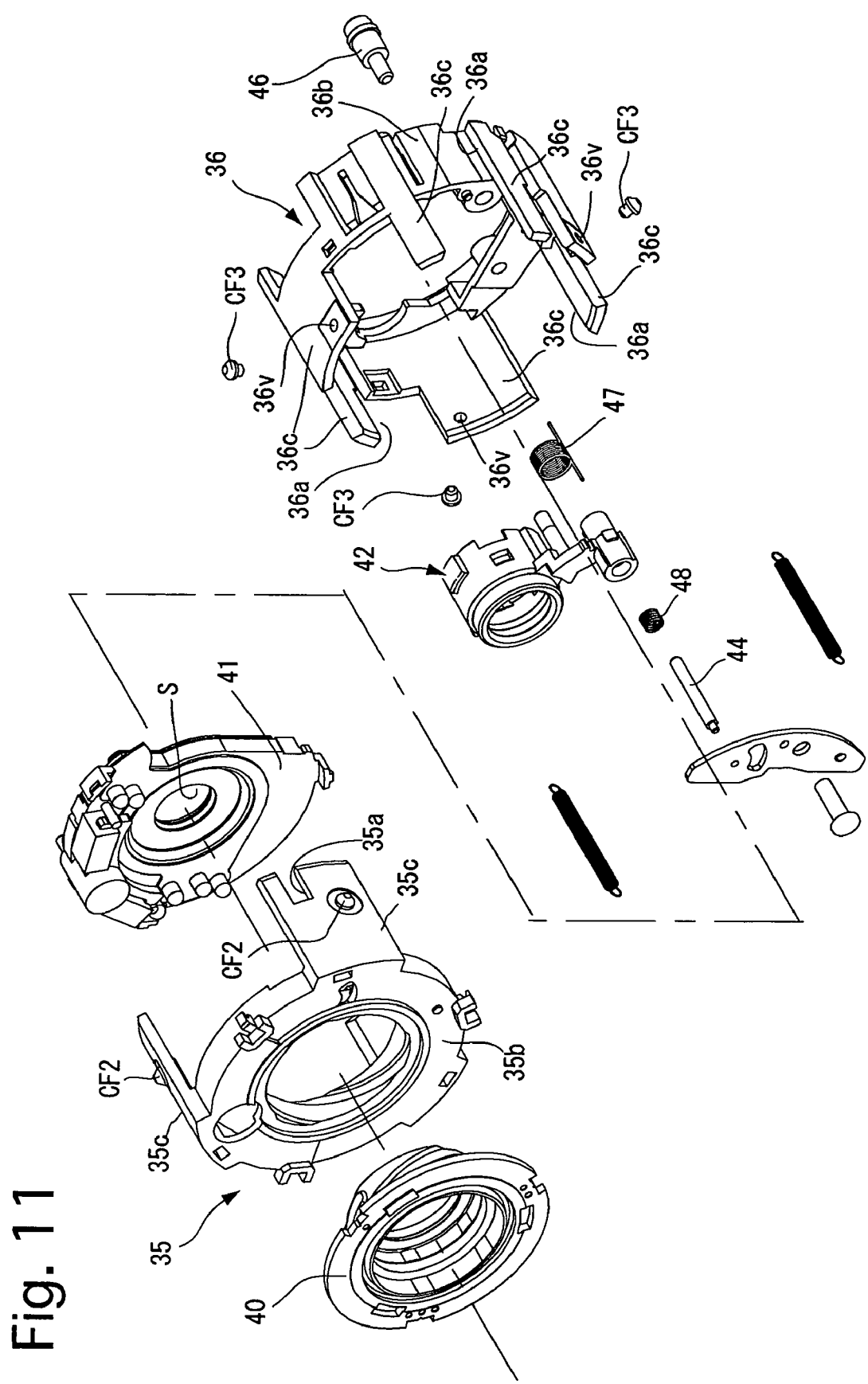
FIG. 11 is an exploded perspective view of a support structure which supports a second lens group and a third lens group of the zoom lens.

The zoom lens 10 is provided inside the stationary barrel 13 with a helicoid ring 25. As shown in FIG. 6, the helicoid ring 25 is provided on an outer peripheral surface thereof with a male helicoid 25a and a set of three rotational guide projections 25b. The male helicoid 25a is engaged with the female helicoid 13a, and the set of three rotational guide projections 25b are engaged in the set of three inclined grooves 13c or the set of three rotational guide grooves 13d, respectively. The helicoid ring 25 is provided on threads of the male helicoid 25a with an annular gear 25c which is in mesh with the zoom gear 22. Therefore, when a rotation of the zoom gear 22 is transferred to the annular gear 25c, the helicoid ring 25 moves forward or rearward in the optical axis direction while rotating about the photographing optical axis Z1 within a predetermined range in which the male helicoid 25a remains in mesh with the female helicoid 13a. A forward movement of the helicoid ring 25 beyond a predetermined point with respect to the stationary barrel 13 causes the male helicoid 25a to be disengaged from the female helicoid 13a so that the helicoid ring 25 rotates about the photographing optical axis Z1 without moving in the optical axis direction relative to the stationary barrel 13 by engagement of the set of three rotational guide projections 25b with the set of three rotational guide grooves 13d. In a state where the female helicoid 13a is in mesh with the male helicoid 25a, the set of three rotational guide projections 25b are positioned in the set of three inclined grooves 13c, respectively, and accordingly, the set of three rotational guide projections 25b and the female helicoid 13a do not interfere with each other.

As can be appreciated from FIGS. 1 through 3, the zoom lens 10 is a telescopic type having three external telescoping barrels: a first external barrel 37, a second external barrel 34 and a third external barrel 26, which are concentrically arranged about the photographing optical axis Z1. The helicoid ring 25 moves together with the third external barrel 26 in the optical axis direction while rotating about the photographing optical axis Z1. The helicoid ring 25 is provided, on an inner peripheral surface thereof at three different circumferential positions on the helicoid ring 25, with three rotation transfer recesses (engaging recesses) 25d, the front ends of which are open at the front end of the helicoid ring 25. The third external barrel 26 is provided, at corresponding three different circumferential positions on the third external barrel 26, with three pairs of rotation transfer projections (engaging projections) 26a which project rearward from the rear end of the third external barrel 26 to be engageable in the three rotation transfer recesses 25d from the front thereof, respectively (see FIG. 14). The three pairs of rotation transfer projections 26a and the three rotation transfer recesses 25d are movable relative to each other in the direction of the photographing optical axis Z1, and are not rotatable relative to each other about the photographing optical axis Z1. Namely, the helicoid ring 25 and the third external barrel 26 rotate integrally. The helicoid ring 25 is provided, on front faces of the three rotational guide projections 25b at three different circumferential positions on the helicoid ring 25, with a set of three engaging recesses 25e which are formed on an inner peripheral surface of the helicoid ring 25 to be open at the front end of the helicoid ring 25. The third external barrel 26 is provided, at corresponding three different circumferential positions on the third external barrel 26, with a set of three engaging projections 26b which project rearward from the rear end of the third external barrel 26, and which also project radially outwards, to be engaged in the set of three engaging recesses 25e from the front thereof, respectively. The set of three engaging projections 26b, which are respectively engaged in the set of three engaging recesses 25e, are also engaged in the set of three rotational guide grooves 13d at a time, respectively, when the set of three rotational guide projections 25b are engaged in the set of three rotational guide grooves 13d.

The third external barrel 26 and the helicoid ring 25 are biased in opposite directions away from each other in the optical axis direction by compression coil springs (not shown). These compression coil springs are installed between the third external barrel 26 and the helicoid ring 25 in a compressed fashion. Therefore, the set of three engaging projections 26b of the third external barrel 26 are respectively pressed against front guide surfaces of the rotational guide grooves 13d therein by the spring force of the compression coil springs. At the same time, the set of three rotational guide projections 25b of the helicoid ring 25 are respectively pressed against rear guide surfaces of the rotational guide grooves 13d therein by the spring force of the compression coil springs.

Figure 14:
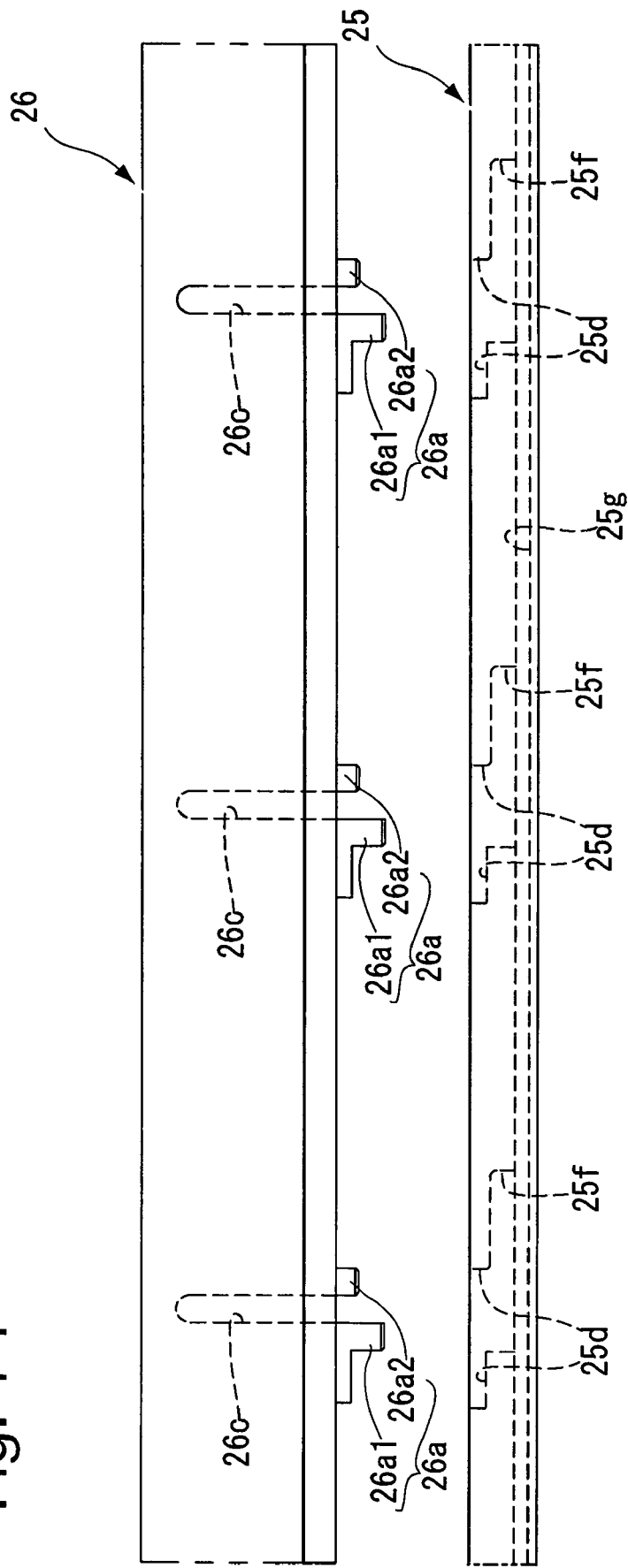
FIG. 14 is a developed view of the helicoid ring and the third external barrel which are shown in FIG. 6.
Figure 19:
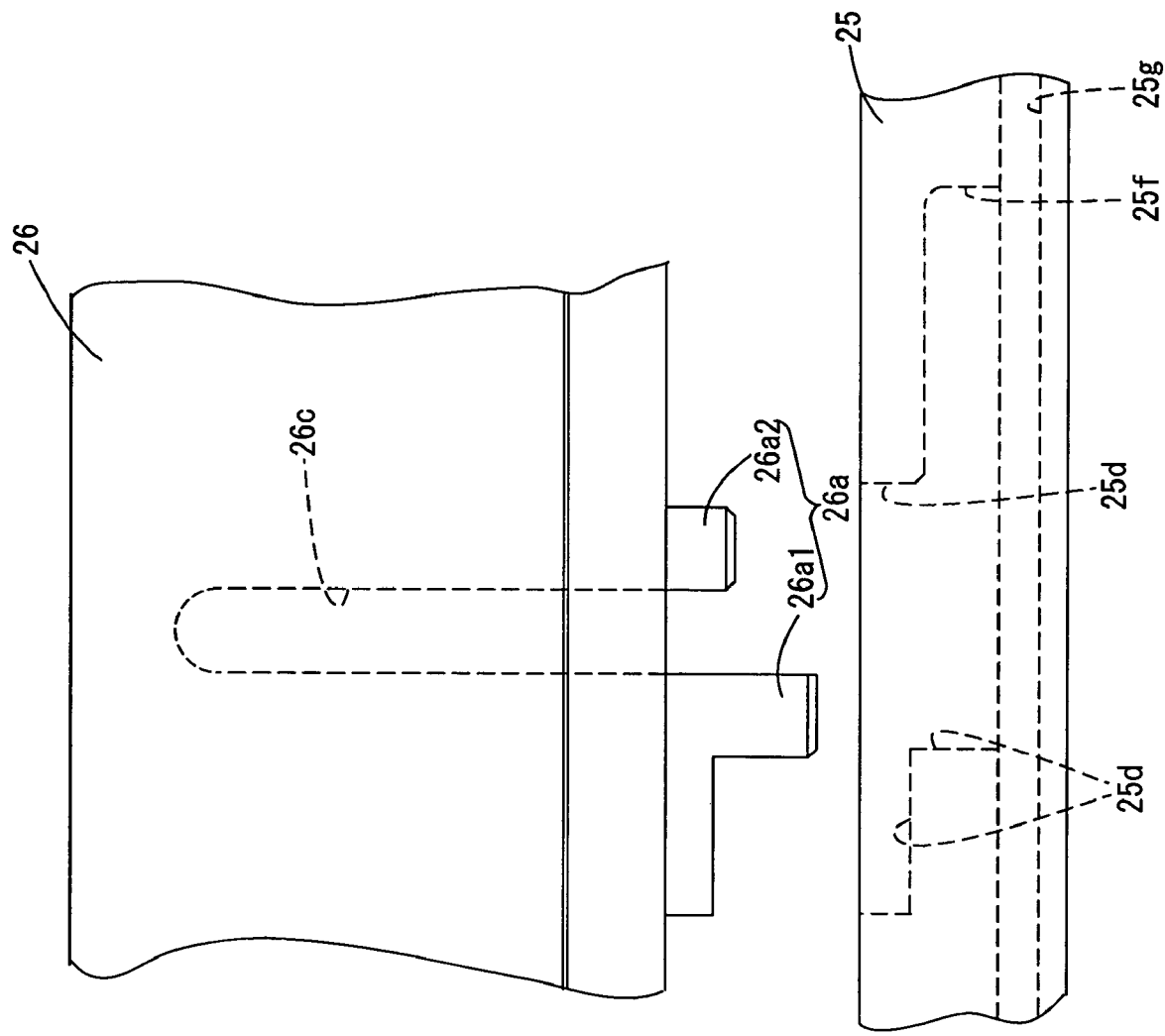
FIG. 19 is a developed view of portions of the helicoid ring and the third external barrel, showing the positional relationship between an engaging recess of the helicoid ring and engaging projections of the third external barrel.
Figure 20:
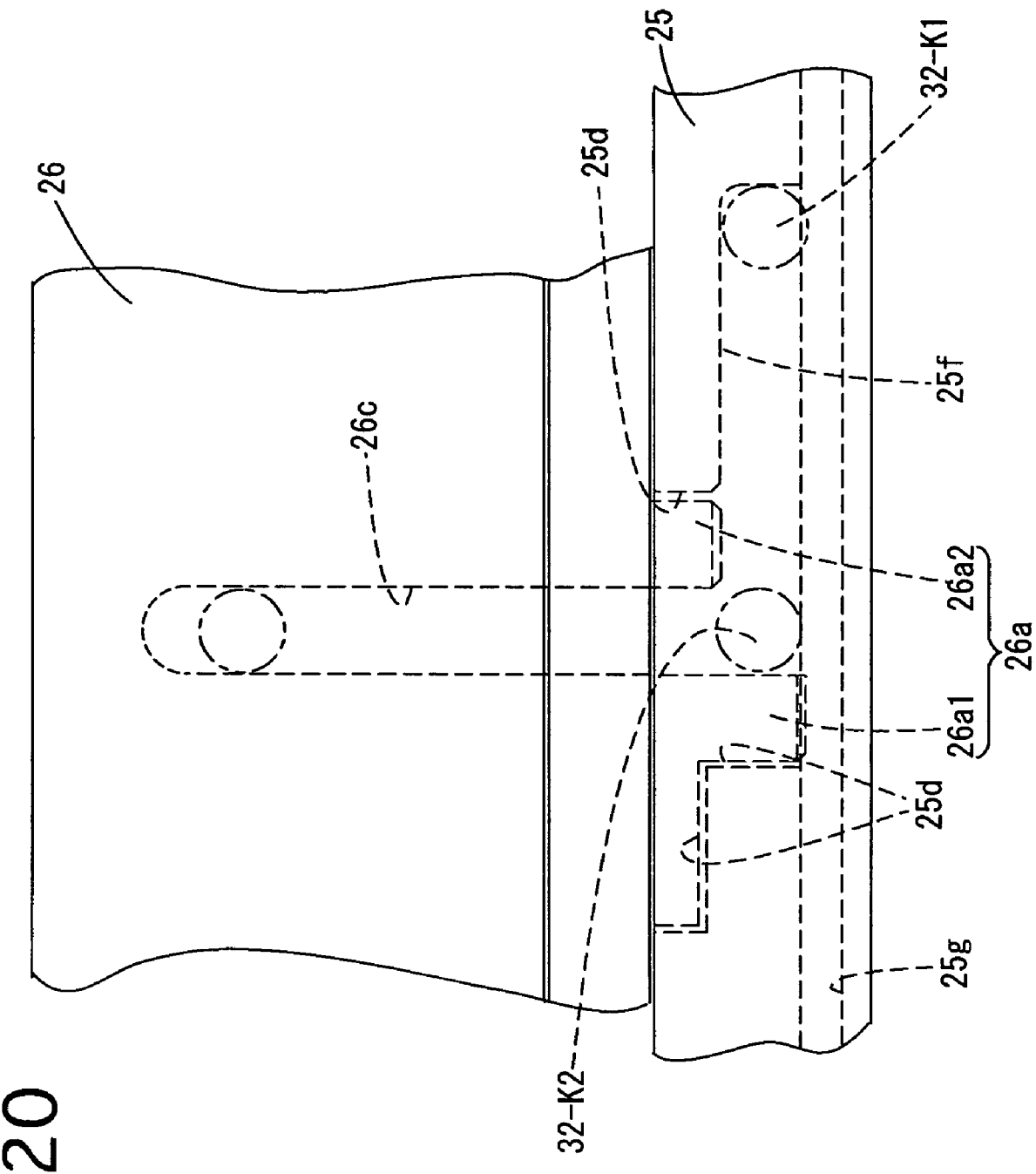
FIG. 20 is a view similar to that of FIG. 19, showing a state of engagement of the engaging recess of the helicoid ring with the engaging projections of the third external barrel.

As shown in FIG. 14, the third external barrel 26 is provided on an inner peripheral surface thereof with a set of three rotation transfer grooves 26c which extend parallel to the photographing optical axis Z1. The front end of each rotation transfer groove 26c is closed at the front end of the third external barrel 26, and the rear end of each rotation transfer groove 26c is open at the rear end of the third external barrel 26. The circumferential positions of the three rotation transfer grooves 26c correspond to those of the three pairs of rotation transfer projections 26a, respectively. More specifically, as shown in FIGS. 14, 19 and 20, each pair of rotation transfer projections 26a consists of a long projection 26a1 and a short projection 26a2 which is smaller than the long projection 26a1 in the amount of projection rearward in the optical axis direction, and the rear end opening of the associated rotation transfer groove 26c is positioned between the long projection 26a1 and the short projection 26a2, and accordingly, surfaces of the long projection 26a1 and the short projection 26a2 which are opposed to each other in a circumferential direction of the third external barrel 26 form a part (the rear end opening) of the associated rotation transfer groove 26c.

On the other hand, the helicoid ring 25 is provided on an inner peripheral surface thereof with a set of three relative rotation allowing grooves 25f which are communicatively connected with the three rotation transfer recesses 25d, respectively. The three relative rotation allowing grooves 25f extend circumferentially on a circle about the photographing optical axis Z1, and one end (left end as viewed in FIG. 14) of each relative rotation allowing groove 25f is communicatively connected with the associated rotation transfer recess 25d, and the other end (right end as viewed in FIG. 14) of each relative rotation allowing groove 25f is formed as a closed end. In a state where the helicoid ring 25 and the third external barrel 26 are coupled to each other, each relative rotation allowing groove 25f is communicatively connected with the rear end opening (the right side surface of the associated long projection 26a1 as viewed in FIG. 20) of the associated rotation transfer groove 26c so that the relative rotation allowing groove 25f and the rotation transfer groove 26c together form an L-shaped groove as shown in FIG. 20.

Figure 13:
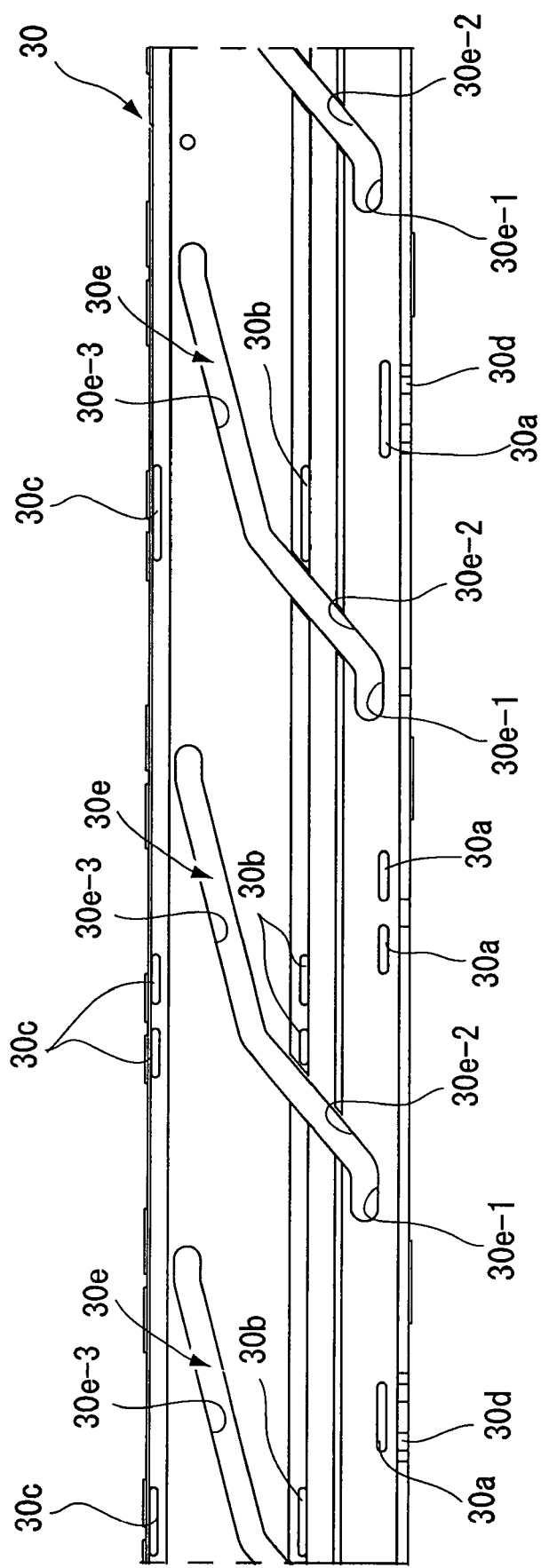
FIG. 13 is a developed view of the first linear guide ring shown in FIG. 6.

The zoom lens 10 is provided inside of the third external barrel 26 and the helicoid ring 25 with a first linear guide ring 30. The helicoid ring 25 is provided on an inner peripheral surface thereof with a circumferential groove 25g which extends in a circumferential direction about the photographing optical axis Z1, and the third external barrel 26 is provided, on an inner peripheral surface thereof in the vicinity of the rear end and the front end of the third external barrel 26, with a rear circumferential groove 26d and a front circumferential groove 26e, respectively, each of which extends in a circumferential direction about the photographing optical axis Z1 (see FIG. 6). As shown in FIGS. 6 and 13, the first linear guide ring 30 is provided on an outer peripheral surface thereof with a first plurality of relative rotation guide projections 30a, a second plurality of relative rotation guide projections 30b and a third plurality of relative rotation guide projections 30c, in that order from the rear of the first linear guide ring 30 in the optical axis direction. The first plurality of relative rotation guide projections 30a, the second plurality of relative rotation guide projections 30b and the third plurality of relative rotation guide projections 30c are engaged in the circumferential groove 25g, the rear circumferential groove 26d and the front circumferential groove 26e, respectively. Due to this engagement, the helicoid ring 25 and the third external barrel 26 are supported by the first linear guide ring 30 to be allowed to rotate relative to the first linear guide ring 30 and to be prevented from moving in the optical axis direction relative to the first linear guide ring 30. In addition, the helicoid ring 25 and the third external barrel 26 are prevented from being separated totally from each other in the optical axis direction via the first linear guide ring 30. The first linear guide ring 30 is provided, in the vicinity of the rear end thereof at different circumferential positions, with a set of three linear guide projections 30d which project radially outwards. The first linear guide ring 30 is guided linearly in the optical axis direction without rotating by the engagement of the set of three linear guide projections 30d with the set of three linear guide grooves 13b of the stationary barrel 13.

The first linear guide ring 30 is provided with a set of three through slots 30e which radially extend through the first linear guide ring 30. As shown in FIG. 13, each through slot 30e includes a circumferential slot portion 30e-1 which extends in a circumferential direction of the first linear guide ring 30, a first lead slot portion 30e-2 which extends obliquely from one end (right end as viewed in FIG. 13) of the circumferential slot portion 30e-1, and a second lead slot portion 30e-3 which extends obliquely from one end (right end as viewed in FIG. 13) of the first lead slot portion 30e-2. The angle of inclination of the first lead slot portion 30e-2 relative to the circumferential direction of the first linear guide ring 30 is greater than that of the second lead slot portion 30e-3. The zoom lens 10 is provided with a cam ring 31, a front part of which is fitted in the first external barrel 37. A set of three roller followers 32 fixed to an outer peripheral surface of the cam ring 31 at different circumferential positions thereon are engaged in the set of three through slots 30e, respectively. The set of three roller followers 32 are further engaged in the set of three rotation transfer grooves 26c (or the set of three relative rotation allowing grooves 25f) through the set of three through slots 30e, respectively.

Advancing operations of movable elements of the zoom lens 10 from the stationary barrel 13 to the cam ring 31 will be discussed hereinafter. Rotating the zoom gear 22 in a lens barrel advancing direction by the zoom motor 23 causes the helicoid ring 25 to move forward while rotating due to engagement of the female helicoid 13a with the male helicoid 25a. This rotation of the helicoid ring 25 causes the third external barrel 26 to move forward together with the helicoid ring 25 while rotating together with the helicoid ring 25, and further causes the first linear guide ring 30 to move forward together with the helicoid ring 25 and the third external barrel 26 because each of the helicoid ring 25 and the third external barrel 26 is coupled to the first linear guide ring 30, to allow respective relative rotations between the third external barrel 26 and the first linear guide ring 30 and between the helicoid ring 25 and the first linear guide ring 30 and to be movable together along a direction of a common rotational axis (i.e., the photographing optical axis Z1), due to the engagement of the first plurality of relative rotation guide projections 30a with the circumferential groove 25g, the engagement of the second plurality of relative rotation guide projections 30b with the rear circumferential groove 26d, and the engagement of the third plurality of relative rotation guide projections 30c with the front circumferential groove 26e.

Figure 15:
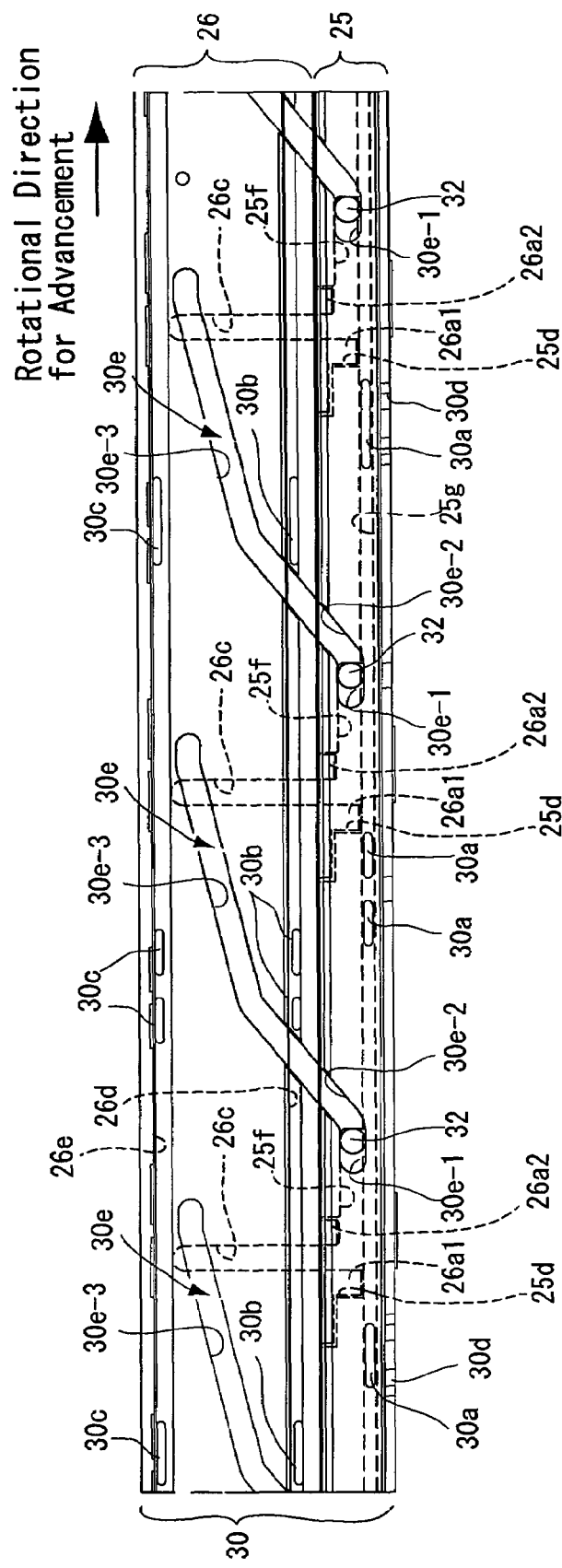
FIG. 15 is a developed view of a set of roller followers fixed to the cam ring, the first linear guide ring, the helicoid ring and the third external barrel, showing the positional relationship thereamong in the retracted state of the zoom lens.
Figure 17:
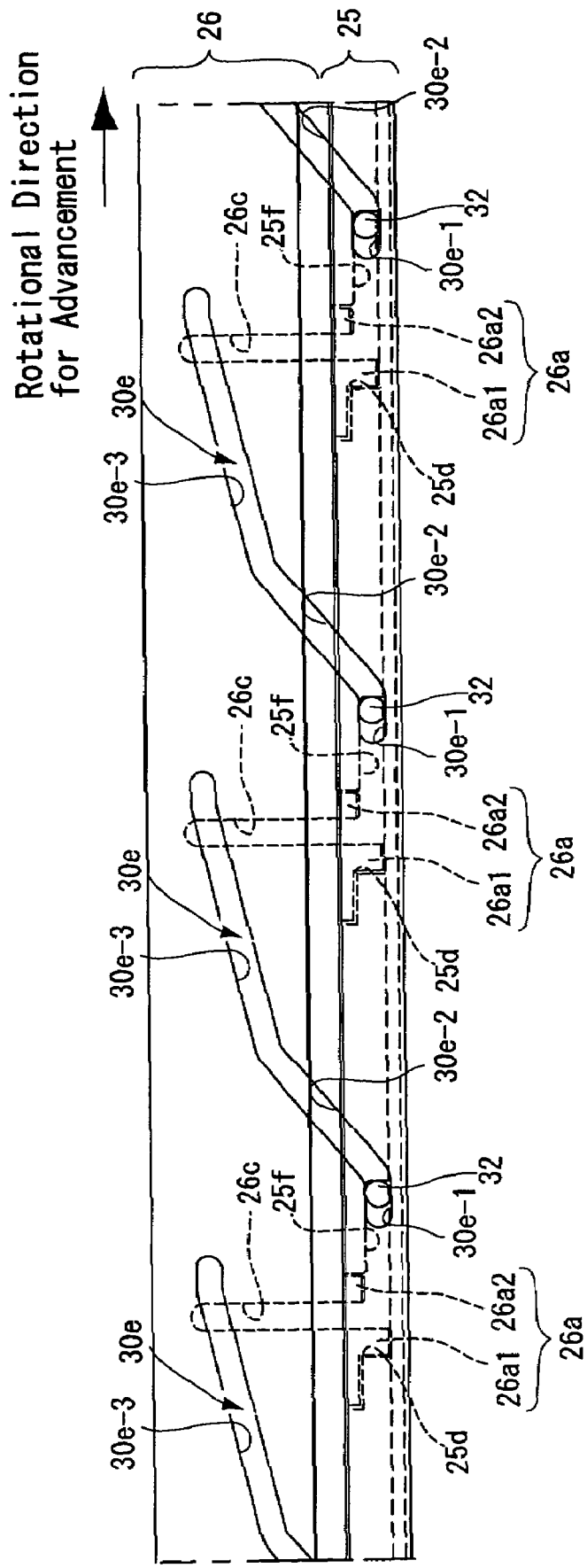
FIG. 17 is a view similar to that of FIG. 15, showing a state where the first linear guide ring has been removed.

In the retracted state of the zoom lens 10, the set of three roller followers 32 are engaged in the circumferential slot portions 30e-1 of the set of three through slots 30e, respectively, and are further engaged in the three relative rotation allowing grooves 25f at closed end portions thereof, respectively, as shown in FIGS. 15 and 17. FIGS. 15 and 17 show the same state, although the first linear guide ring 30 is removed in FIG. 17 except the set of three through slots 30e for the purpose of making the operation of each roller follower 32 easier to be seen in the drawing. In addition, in FIGS. 15 and 17, the first linear guide ring 30 (the set of three through slots 30e) are shown by solid lines though actually positioned a hidden position below (radially inside) the helicoid ring 25 and the third external barrel 26.

When the helicoid ring 25 and the third external barrel 26 are moved forward while rotating, this rotation of the helicoid ring 25 and the third external barrel 26 is not transferred to the cam ring 31 in an initial stage of the forward movement of the helicoid ring 25 and the third external barrel 26 because the set of three roller followers 32 are engaged in the set of three relative rotation allowing grooves 25f, respectively. The set of three roller followers 32 move together with the helicoid ring 25, the third external barrel 26 and the first linear guide ring 30 in the optical axis direction due to the engagement of the set of three roller followers 32 with the circumferential slot portions 30e-1 of the set of three through slots 30e, respectively. Accordingly, in an initial stage of the advancing operation of the zoom lens 10 from the retracted state of the zoom lens 10, the cam ring 31 is moved forward in the optical axis direction without rotating.

Figure 16:
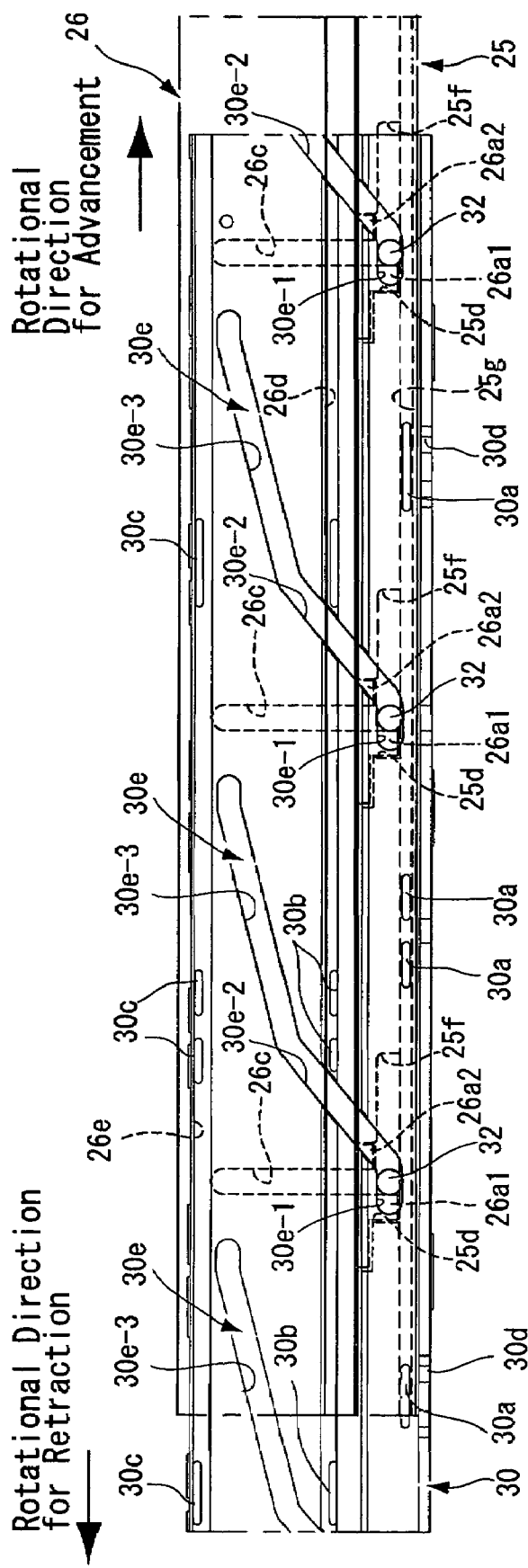
FIG. 16 is a view similar to that of FIG. 15, showing the positional relationship among the set of roller followers, the first linear guide ring, the helicoid ring and the third external barrel, in a state where the zoom lens has been slightly extended forward from the retracted state of the zoom lens.
Figure 18:
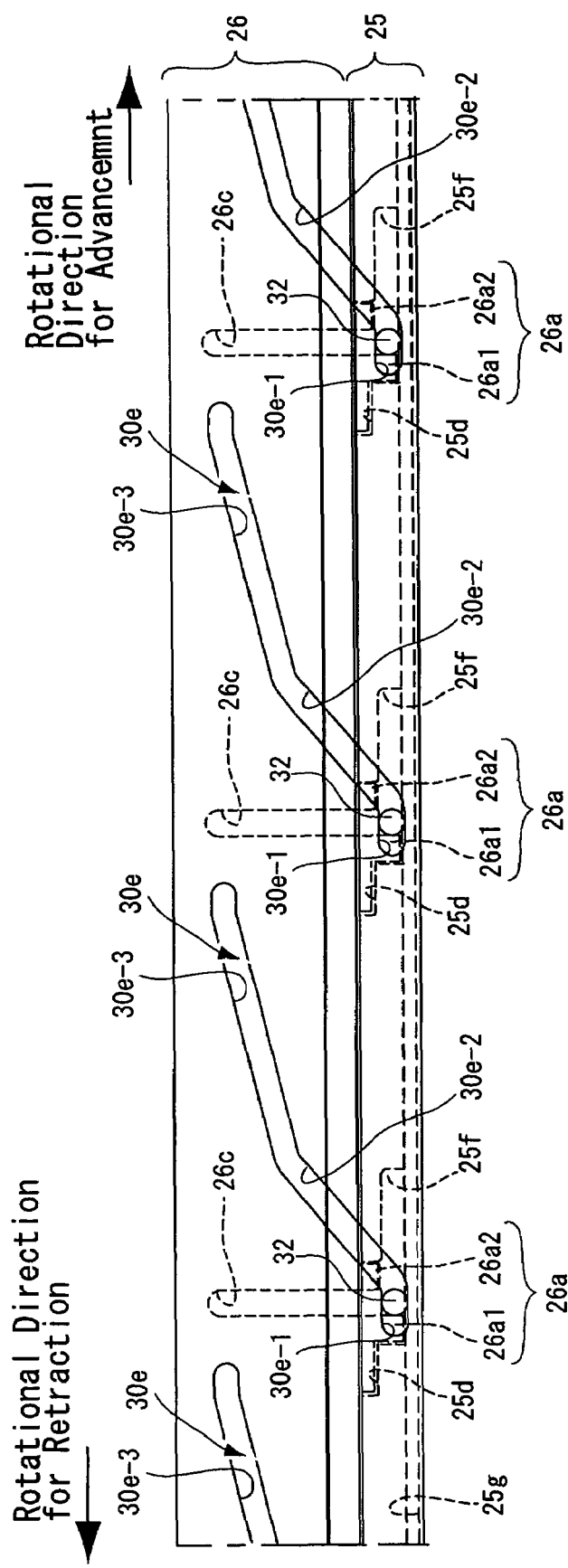
FIG. 18 is a view similar to that of FIG. 16, showing a state where the first linear guide ring has been removed.

FIGS. 16 and 18 show a state of the helicoid ring 25 and the third external barrel 26 which have been rotated by an angle of approximately 30 degrees from their respective retracted positions from the retracted state of the zoom lens 10 shown in FIGS. 15 and 17. In the state shown in FIGS. 16 and 18, each roller follower 32 is engaged in an intersection of the associated relative rotation allowing groove 25f and the associated rotation transfer groove 26c so that the rotation of the helicoid ring 25 and the third external barrel 26 can be transferred to the roller follower 32 via a side surface (left surface as viewed in FIG. 20) of the rotation transfer groove 26c at the left end of the relative rotation allowing groove 25f. A further forward movement of the helicoid ring 25 and the third external barrel 26 while rotating causes each roller follower 32 to be moved rightward as viewed in FIGS. 16 and 18 from the circumferential slot portions 30e-1 to the first lead slot portion 30e-2 of the associated through slot 30e. Since the first lead slot portion 30e-2 of each through slot 30e is inclined to the circumferential direction of the first linear guide ring 30 in a manner to approach the front end (upper end as viewed in FIG. 16) of the first linear guide ring 30 in a direction away from the circumferential slot portions 30e-1 of the associated through slot 30e, a forward movement of each roller follower 32 in the first lead slot portion 30e-2 of the associated through slot 30e causes the roller follower 32 to be disengaged from the associated relative rotation allowing groove 25f to be engaged in the associated rotation transfer groove 26c (i.e., the roller follower 32 is led from the associated relative rotation allowing groove 25f to the associated rotation transfer groove 26c) In a state where the set of three roller followers 32 are engaged in the set of three rotation transfer grooves 26c, respectively, the torque (rotating force) of the third external barrel 26 is transferred to the cam ring 31 via the engagement of the set of three roller followers 32 with the set of three rotation transfer grooves 26c whenever the third external barrel 26 rotates. Thereupon, the cam ring 31 moves forward while rotating relative to the first linear guide ring 30 in accordance with contours of the first lead slot portions 30e-2 of the set of three through slots 30e. At this time, each roller follower 32 moves forward in the optical axis direction in the associated rotation transfer groove 26c while receiving a torque from the same rotation transfer groove 26c. Since the first linear guide ring 30 itself has linearly moved forward together with the helicoid ring 25 and the third external barrel 26 as described above, the cam ring 31 moves forward in the optical axis direction by a resultant amount of movement corresponding to the sum of the amount of the forward movement of the first linear guide ring 30 (and the helicoid ring 25 and the third external barrel 26) and the amount of the forward movement of the cam ring 31 via the engagement of the set of three roller followers 32 with the first lead slot portions 30e-2 of the set of three through slots 30e, respectively.

The above described rotating-advancing operations of the helicoid ring 25 and the third external barrel 26 are performed only when the male helicoid 25a and the female helicoid 13a are engaged with each other. At this time, the set of three rotational guide projections 25b are moving in the set of three inclined grooves 13c, respectively. When the helicoid ring 25 is moved forward by a predetermined amount of movement, the male helicoid 25a and the female helicoid 13a are disengaged from each other so that the set of three rotational guide projections 25b move from the set of three inclined grooves 13c into the set of three rotational guide grooves 13d, respectively. Since the helicoid ring 25 does not move in the optical axis direction relative to the stationary barrel 13 even if rotating upon the disengagement of the male helicoid 25a from the female helicoid 13a, the helicoid ring 25 and the third external barrel 26 rotate at respective axial fixed positions thereof without moving in the optical axis direction due to the slidable engagement of the set of three rotational guide projections 25b with the set of three rotational guide grooves 13d.

Furthermore, after a lapse of a predetermined period of time from the moment at which the set of three rotational guide projections 25b slide into the set of three rotational guide grooves 13d from the set of three inclined grooves 13c, respectively, the set of three roller followers 32 enter the second lead slot portions 30e-3 from the first lead slot portions 30e-2 of the set of three through slots 30e, respectively. Since the second lead slot portion 30e-3 of each through slot 30e is inclined to the first linear guide ring 30 in a direction away from the associated first lead slot portion 30e-2 and approaching the front end (upper end as viewed in FIG. 16) of the first linear guide ring 30, further rotation of the helicoid ring 25 and the third external barrel 26 at respective axial fixed positions thereof in a lens barrel advancing direction causes each roller follower 32 to move forward in the second lead slot portion 30e-3 of the associated through slot 30e. Namely, the cam ring 31 is moved forward while rotating relative to the first linear guide ring 30 in accordance with contours of the second lead slot portions 30e-3 of the set of three through slots 30e. The helicoid ring 25 and the third external barrel 26 serve as a rotating drive member which transfers torque to the cam ring 31 via the engagement of the set of three roller followers 32 with the set of three through slots 30e and the engagement of the set of three roller followers 32 with the set of three rotation transfer grooves 26c.

Rotating the zoom gear 22 in a lens barrel retracting direction thereof via the zoom motor 23 causes the aforementioned movable elements of the zoom lens 10 from the stationary barrel 13 to the cam ring 31 to operate in the reverse manner to the above described advancing operations. In this reverse operation, the helicoid ring 25 and the third external barrel 26 which rotate at respective axial fixed positions thereof move rearward in the optical axis direction while rotating after the male helicoid 25a and the female helicoid 13a are engaged with each other. The first linear guide ring 30 linearly moves in the optical axis direction without rotating at all times while following the rearward linear movement of the helicoid ring 25 and the third external barrel 26. When the set of three roller followers 32 are engaged in the first lead slot portions 30e-2 or the second lead slot portions 32e-3 of the set of three through slots 30e, respectively, the cam ring 31 moves rearward in the optical axis direction relative to the helicoid 25, the third external barrel 26 and the first linear guide ring 30 by rotation of the helicoid ring 25 and the third external barrel 26 in the lens barrel retracting direction thereof. At this time, each roller follower 32 moves rearward in the optical axis direction in the associated rotation transfer groove 26c while receiving a torque from the same rotation transfer groove 26c. Thereafter, upon moving into the circumferential slot portions 30e-1 from the first lead slot portion 30e-2 of the associated through slot 30e, each roller follower 32 is disengaged from the associated rotation transfer groove 26c at the rear opening end thereof to be engaged in the associated relative rotation allowing groove 25f. At this time, the rotation of the helicoid ring 25 and the third external barrel 26 stops being transferred to the set of three roller followers 32, and accordingly, the cam ring 31 is moved rearward in the optical axis direction without rotating together with the helicoid ring 25, the third external barrel 26 and the first linear guide ring 30. Each roller follower 32 moves in the associated relative rotation allowing groove 25f, and the zoom lens 10 falls into the retracted position thereof upon each roller follower 32 reaching the closed end (right end as viewed in FIG. 14) of the associated relative rotation allowing groove 25f.

The structure of the zoom lens 10 radially inside of the cam ring 31 will be discussed hereinafter. As shown in FIG. 6, the first linear guide ring 30 is provided on an inner peripheral surface thereof with a set of three pairs of first linear guide grooves 30f which are formed at different circumferential positions to extend parallel to the photographing optical axis Z1, and a set of six second linear guide grooves 30g which are formed at different circumferential positions to extend parallel to the photographing optical axis Z1. Each pair of first linear guide grooves 30f are respectively positioned on the opposite sides of the associated second linear guide groove 30g (every second linear guide groove 30g) in a circumferential direction of the first linear guide ring 30. The zoom lens 10 is provided inside of the first linear guide ring 30 with a second linear guide ring (linear guide member) 33. The second linear guide ring 33 is provided on an outer edge thereof with a set of three bifurcated projections 33a (see FIGS. 7 through 10 and 24) which project radially outwards from a ring portion 33b of the second linear guide ring 33. Each bifurcated projection 33a is provided at a radially outer end thereof with a pair of radial projections which are respectively engaged in the associated pair of first linear guide grooves 30f. On the other hand, a set of six radial projections 34a (see FIG. 12) which are formed on an outer peripheral surface of the second external barrel 34 at a rear end thereof and project radially outwards are engaged in the set of six second linear guide grooves 30g to be slidable therealong, respectively. Therefore, each of the second linear guide ring 33 and the set of six radial projections 34a of the second external barrel 34 is guided in the optical axis direction via the first linear guide ring 30. The zoom lens 10 is provided inside of the cam ring 31 with a second lens group moving frame (optical element support frame) 35 which indirectly supports and holds the second lens group LG2. The first external barrel 37 indirectly supports the first lens group LG1, and is positioned inside of the second external barrel 34. The zoom lens 10 is provided radially inside of the cam ring 31 with a third lens group moving frame (optical element support frame) 36. The second linear guide ring 33 serves as a linear guide member for guiding both the second lens group moving frame 35 that supports the second lens group LG2 and the third lens group moving frame 36 that supports the third lens group LG3 linearly without rotating the second lens group moving frame 35 and the third lens group moving frame 36, while the set of six radial projections 34a of the second external barrel 34 serve as linear guide members for guiding the first external barrel 37 linearly without rotating.

Figure 22:
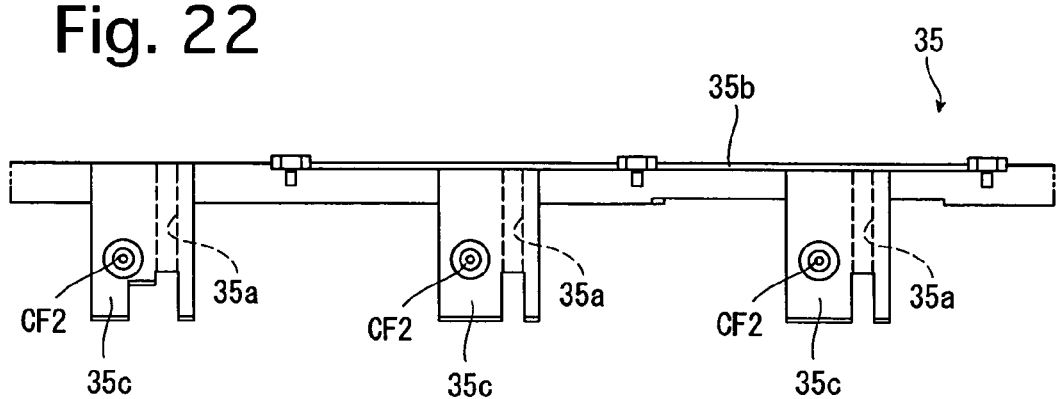
FIG. 22 is a developed view of the second lens group moving frame.
Figure 23:
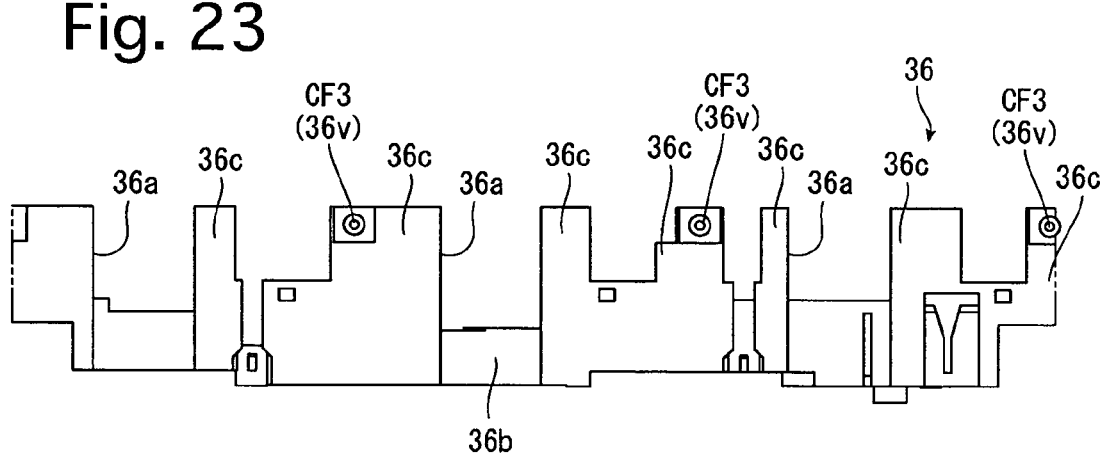
FIG. 23 is a developed view of the third lens group moving frame.
Figure 24:
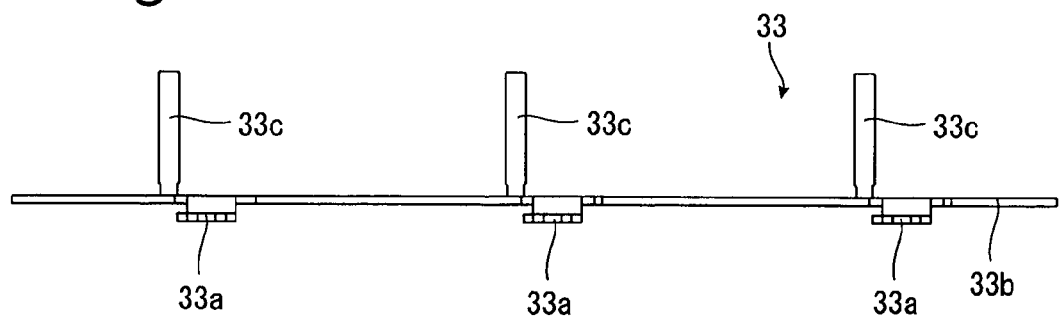
FIG. 24 is a developed view of the second linear guide ring.
Figure 25:
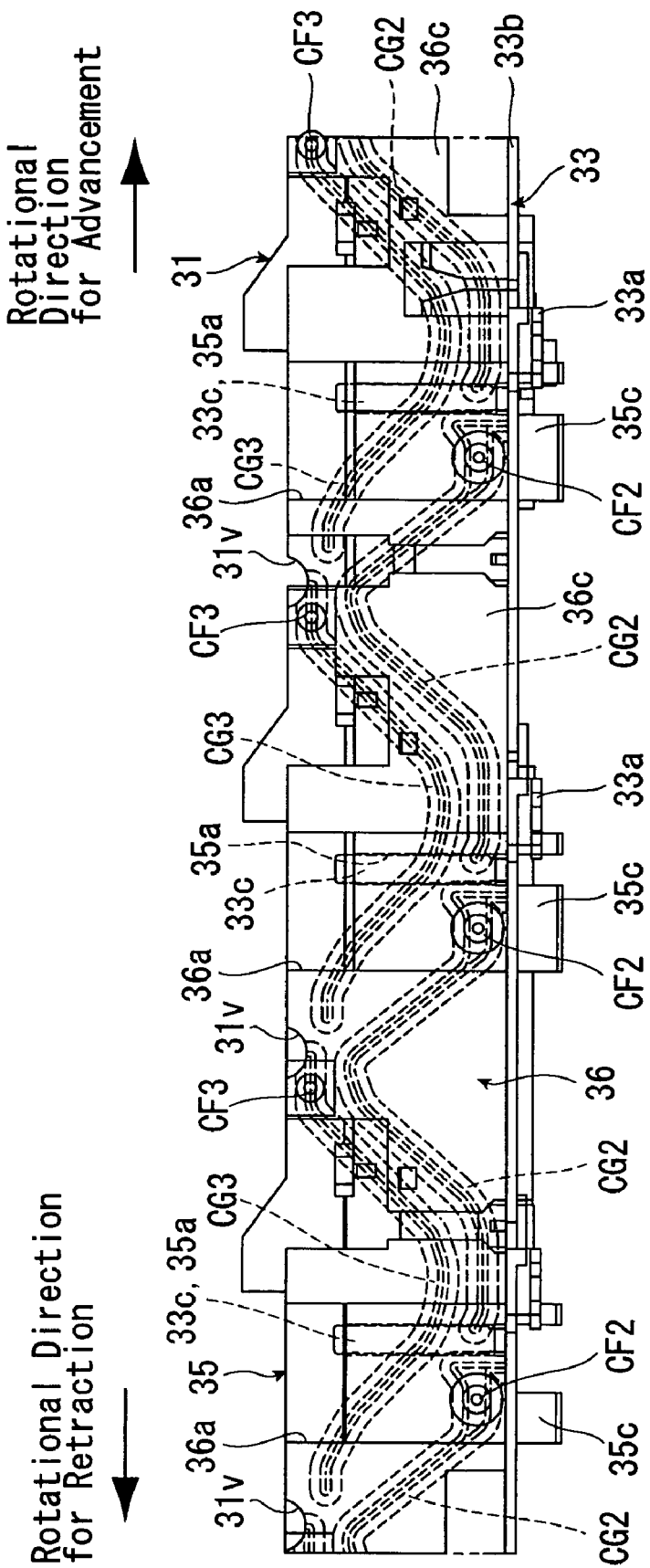
FIG. 25 is a developed view of the second lens group moving frame, the third lens group moving frame, the cam ring and the second linear guide ring, showing the positional relationship thereamong in the retracted state of the zoom lens.

As shown in FIGS. 7 through 10 and 24, the second linear guide ring 33 is provided on the ring portion 33b with a set of three linear guide keys 33c which project forward parallel to one another from the ring portion 33b. As shown in FIGS. 1 through 3, a discontinuous outer edge of the ring portion 33b is engaged in a discontinuous circumferential groove 31a formed on an inner peripheral surface of the cam ring 31 at the rear end thereof to be rotatable about the photographing optical axis Z1 relative to the cam ring 31 and to be immovable relative to the cam ring 31 in the optical axis direction. The set of three linear guide keys 33c project forward from the ring portion 33b into the cam ring 31. The second lens group moving frame 35 is provided with a corresponding set of three guide grooves 35a in which the set of three linear guide keys 33c are engaged, respectively (see FIGS. 25 through 28). As shown in FIG. 22, the second lens group moving frame 35 is further provided with a ring portion 35b having its center on the photographing optical axis Z1, and a set of three rearward projections (linear guide portions) 35c which project rearward in parallel to one another from the ring portion 35b in the optical axis direction. The aforementioned set of three linear guide grooves 35a are formed on the set of three rearward projections 35c, respectively. The set of three rearward projections 35c are arranged at substantially equi-angular intervals in a circumferential direction of the second lens group moving frame 35. The set of three rearward projections 35c are engaged in a corresponding set of three linear guide grooves (linear guide portions) 36a formed on an outer peripheral surface of the third lens group moving frame 36 at different circumferential positions to be slidable thereon along the set of three linear guide grooves 36a, respectively (see FIGS. 8, 9 and 25 through 28). As shown in FIG. 23, the third lens group moving frame 36 is provided with a ring portion 36b having its center on the photographing optical axis Z1, and a set of six forward projections (linear guide portions) 36c which project both radially outwards from the ring portion 36b and forward in parallel to one another from the ring portion 36b in the optical axis direction. Each of the aforementioned set of three linear guide grooves 36a is formed by a combination of an outer peripheral surface of the ring portion 36b (bottom surface of the linear guide groove 36a) and side surfaces of associated adjacent two forward projections 36c on opposite sides of the outer peripheral surface of the ring portion 36b in a circumferential direction thereof. Accordingly, side surfaces of each forward projection 36c, which are positioned on the opposite sides thereof in a circumferential direction of the third lens group moving frame 36 to extend in the optical axis direction, and side surfaces of each rearward projection 35c, which are positioned on the opposite sides thereof in a circumferential direction of the second lens group moving frame 35 to extend in the optical axis direction, serve as linear guide surfaces for guiding the second lens group moving frame 35 and the third lens group moving frame 36 linearly in the optical axis direction to be linearly movable in the optical axis direction relative to each other. The second lens group moving frame 35 and the third lens group moving frame 36 are biased toward each other in the optical axis direction. Due to this structure of engagement between the second lens group moving frame 35 and the third lens group moving frame 36, the second lens group moving frame 35 is guided linearly in the optical axis direction by the second linear guide ring 33, and the third lens group moving frame 36 is guided linearly in the optical axis direction by the second lens group moving frame 35.

As shown in FIGS. 7 through 10 and 21, the cam ring 31 is provided on an inner peripheral surface thereof with a set of three front inner cam grooves CG3, and a set of three rear inner cam grooves (first cam grooves) CG2 formed behind the set of three front inner cam grooves (second cam grooves) CG3. The set of three front inner cam grooves CG3 and the set of three rear inner cam grooves CG2 determine the moving manner of the second lens group LG2 and the moving manner of the third lens group LG3, respectively. The second lens group moving frame 35 is provided on outer peripheral surfaces of the set of three rearward projections 35c with a set of three rear cam followers (first cam followers) CF2 which are engaged in the set of three rear inner cam grooves CG2 of the cam ring 31, respectively. The third lens group moving frame 36 is provided on outer peripheral surfaces of three of the six forward projections 36c with a set of three front cam followers (second cam followers) CF3 which are engaged in the set of three front inner cam grooves CG3 of the cam ring 31, respectively. Each of the following four sets of grooves or followers, i.e., the set of three front inner cam grooves CG3, the set of three rear inner cam grooves CG2, the set of three front cam followers CF3 and the set of three rear cam followers CF2, are formed at substantially equi-angular intervals in a circumferential direction about the photographing optical axis Z1. Since each of the second lens group moving frame 35 and the third lens group moving frame 36 is guided linearly in the optical axis direction directly or indirectly by the second linear guide ring 33, a rotation of the cam ring 31 causes the second lens group moving frame 35 and the third lens group moving frame 36 to move in the optical axis direction in a predetermined moving manner in accordance with contours of the set of three rear inner cam grooves CG2 and the front inner cam grooves CG3. This cam mechanism will be discussed in detail later.

The zoom lens 10 is provided with a second lens frame 40 which supports the second lens group LG2. The second lens frame 40 is supported by the ring portion 35b of the second lens group moving frame 35 (see FIG. 11). The second lens frame 40 is fixed to the ring portion 35b of the second lens group moving frame 35 by the engagement of a male screw thread (adjusting screw) formed on an outer peripheral surface of the second lens frame 40 with a female screw thread (adjusting screw) formed on an inner peripheral surface of the second lens group moving frame 40. The male screw thread of the second lens frame 40 and the female screw thread of the second lens group moving frame 35 are formed with respective centers thereof on the photographing optical axis Z1. Accordingly, the position of the second lens frame 40 relative to the second lens group moving frame 35 in the optical axis direction can be adjusted by rotating the second lens frame 40 relative to the second lens group moving frame 35.

The zoom lens 10 is provided between the second and third lens groups LG2 and LG3 with a shutter unit 41 including the shutter S. The shutter unit 41 is positioned radially inside of the third lens group moving frame 36 to be supported thereby. An actuator for driving the shutter S is incorporated in the shutter unit 41.

Figure 31:
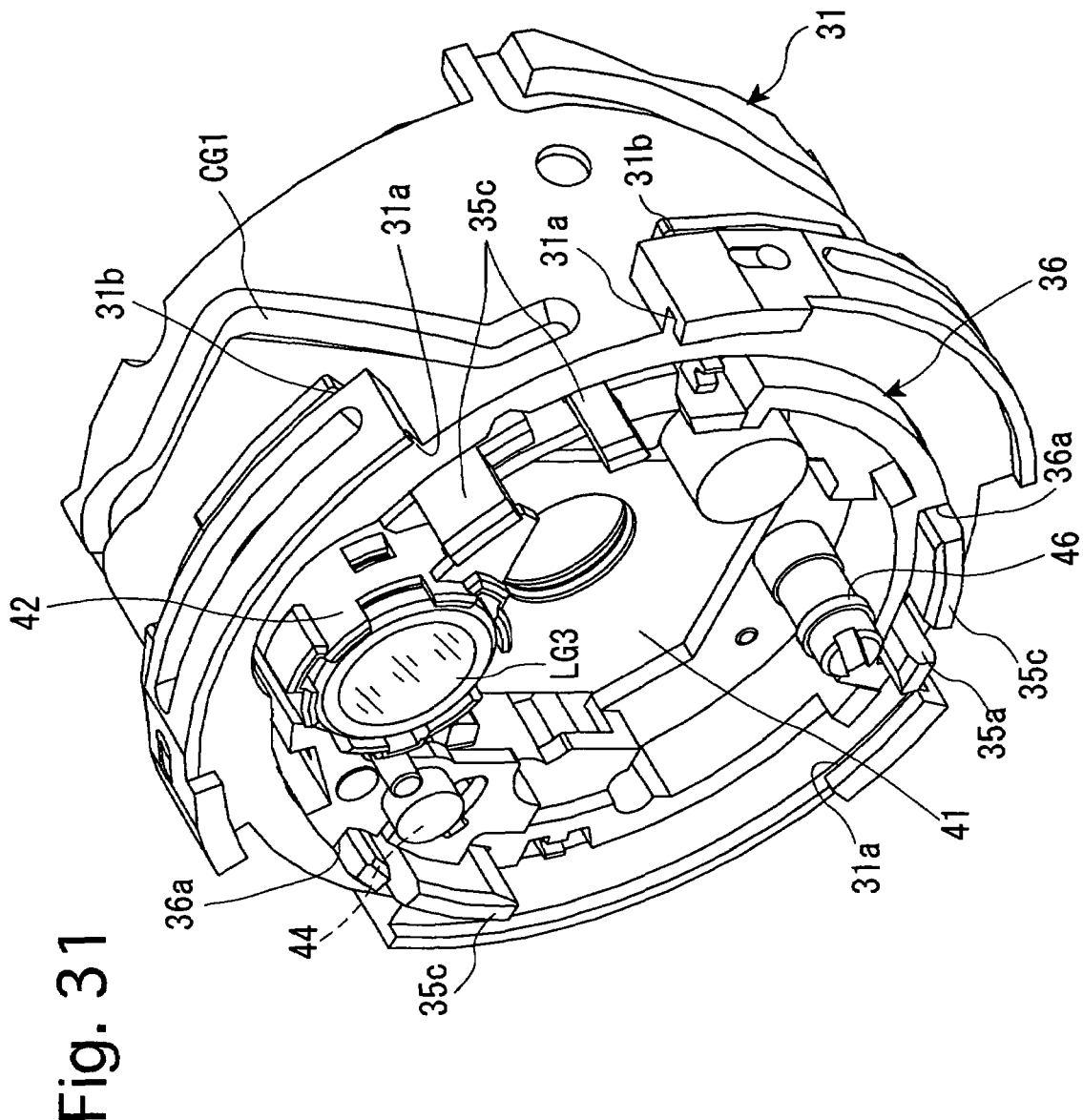
FIG. 31 is a perspective view of the cam ring, the third lens group moving frame and the third lens frame in the retracted state of the zoom lens, viewed obliquely from behind.
Figure 32:
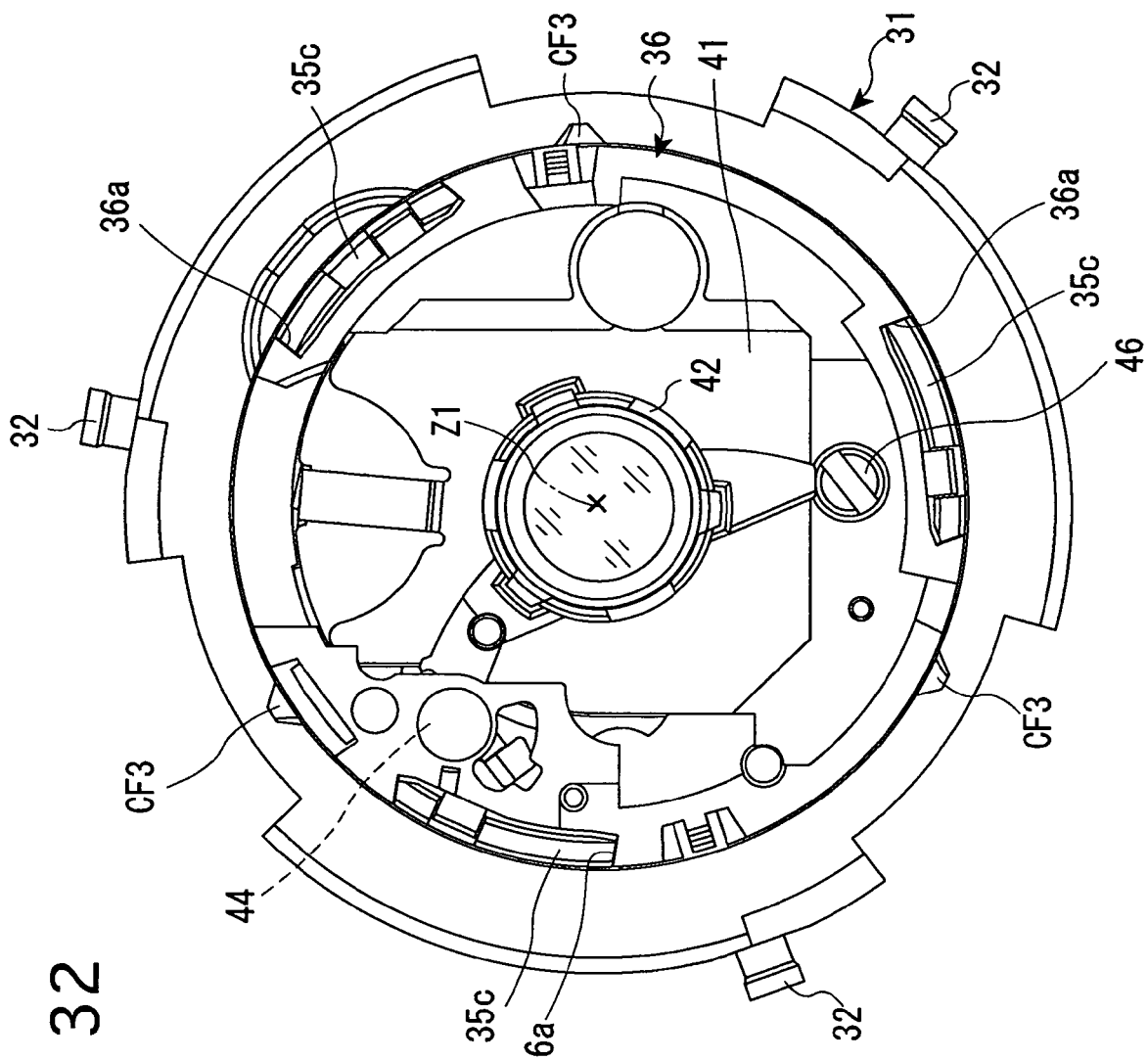
FIG. 32 is a rear elevational view of the cam ring, the third lens group moving frame and the third lens frame in the state shown in FIG. 30, in which the third lens frame is held in the photographing position thereof.
Figure 33:
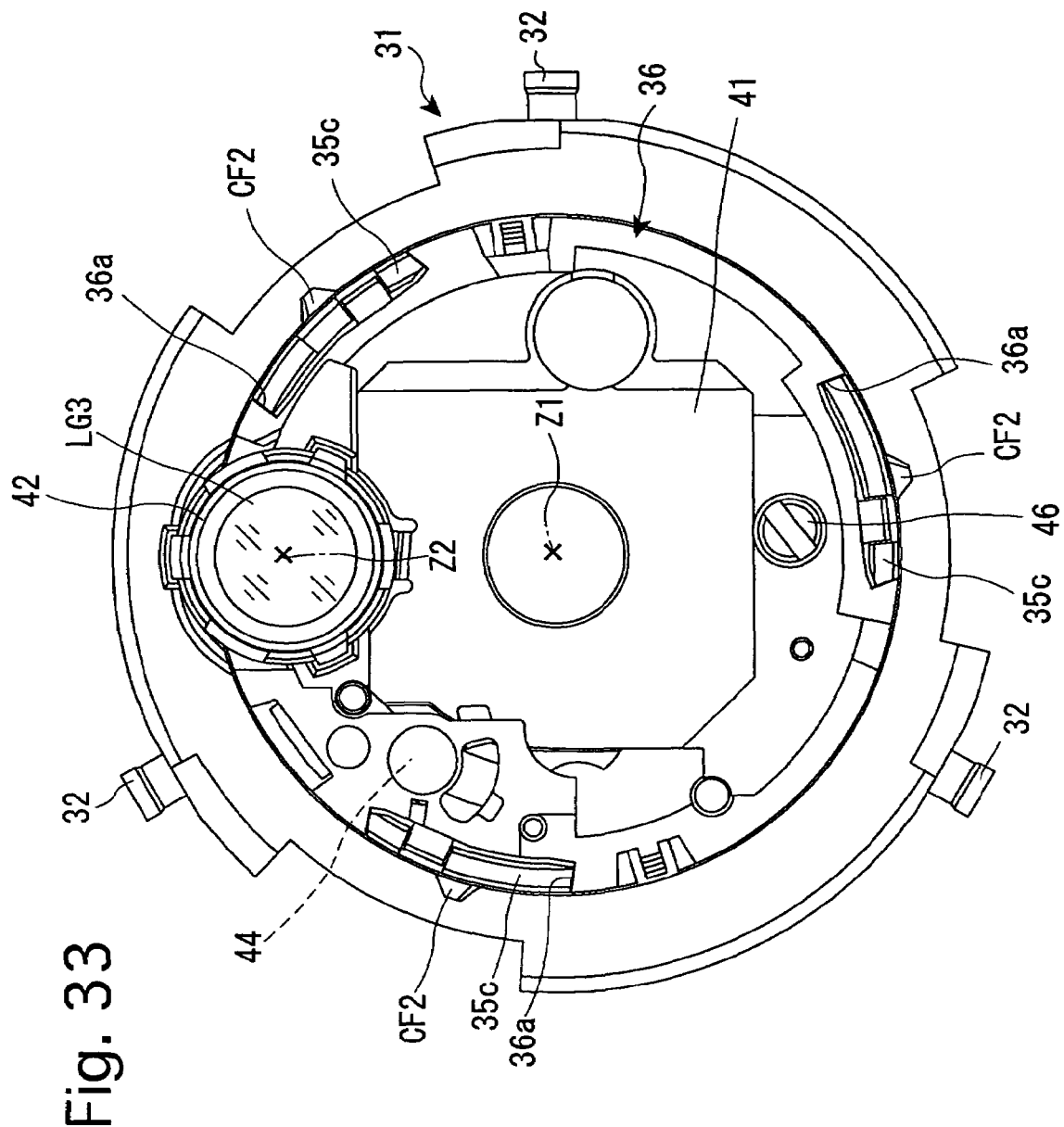
FIG. 33 is a rear elevational view of the cam ring, the third lens group moving frame and the third lens frame in the state shown in FIG. 31, in which the third lens frame is held in the radially-retracted position thereof.

The zoom lens 10 is provided inside of the third lens group moving frame 36 with a third lens frame (radially-retractable lens frame) 42 which supports and holds the third lens group LG3 to be positioned behind the shutter unit 41. The third lens frame 42 is pivoted about a pivot shaft 44 which is fixed to the third lens group moving frame 36 to project forward. The pivot shaft 44 is positioned a predetermined distance away from the photographing optical axis Z1, and extends parallel to the photographing optical axis Z1. The third lens frame 42 is swingable about the pivot shaft 44 between a photographing position shown in FIGS. 1, 2, 30 and 32 where the optical axis of the third lens group LG3 coincides with the photographing optical axis Z1 and a radially-retracted position shown in FIGS. 3, 31 and 33 where the optical axis of the third lens group LG3 is positioned at a radially retracted optical axis Z2 (FIGS. 3 and 33). A rotation limit pin (stop pin) 46, which prevents the third lens frame 42 from rotating clockwise as viewed in FIG. 32 beyond a predetermined point to determine the photographing position of the third lens frame 42, is fixed to the third lens group moving frame 36. The third lens frame 42 is biased to rotate in a direction (clockwise as viewed in FIG. 32) to come into contact with the rotation limit pin 46 by a torsion coil spring 47. A compression coil spring 48 is fitted on the pivot shaft 44 to bias the third lens frame 42 rearward in the optical axis direction to remove backlash between the third lens frame 42 and the third lens group moving frame 36.

Figure 29:
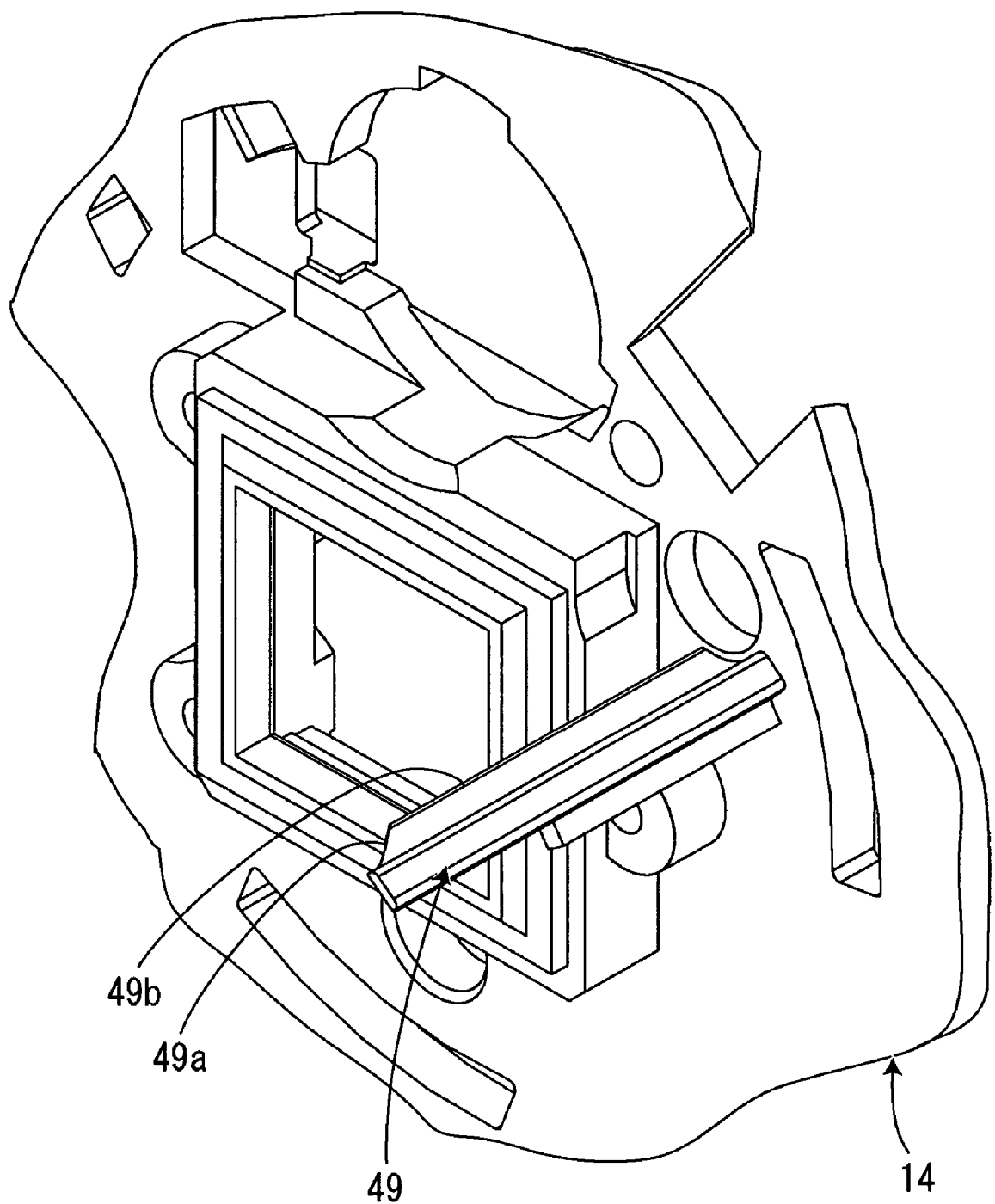
FIG. 29 is a perspective view of a portion of the CCD holder in the vicinity of a position-control cam bar thereof.
Figure 30:
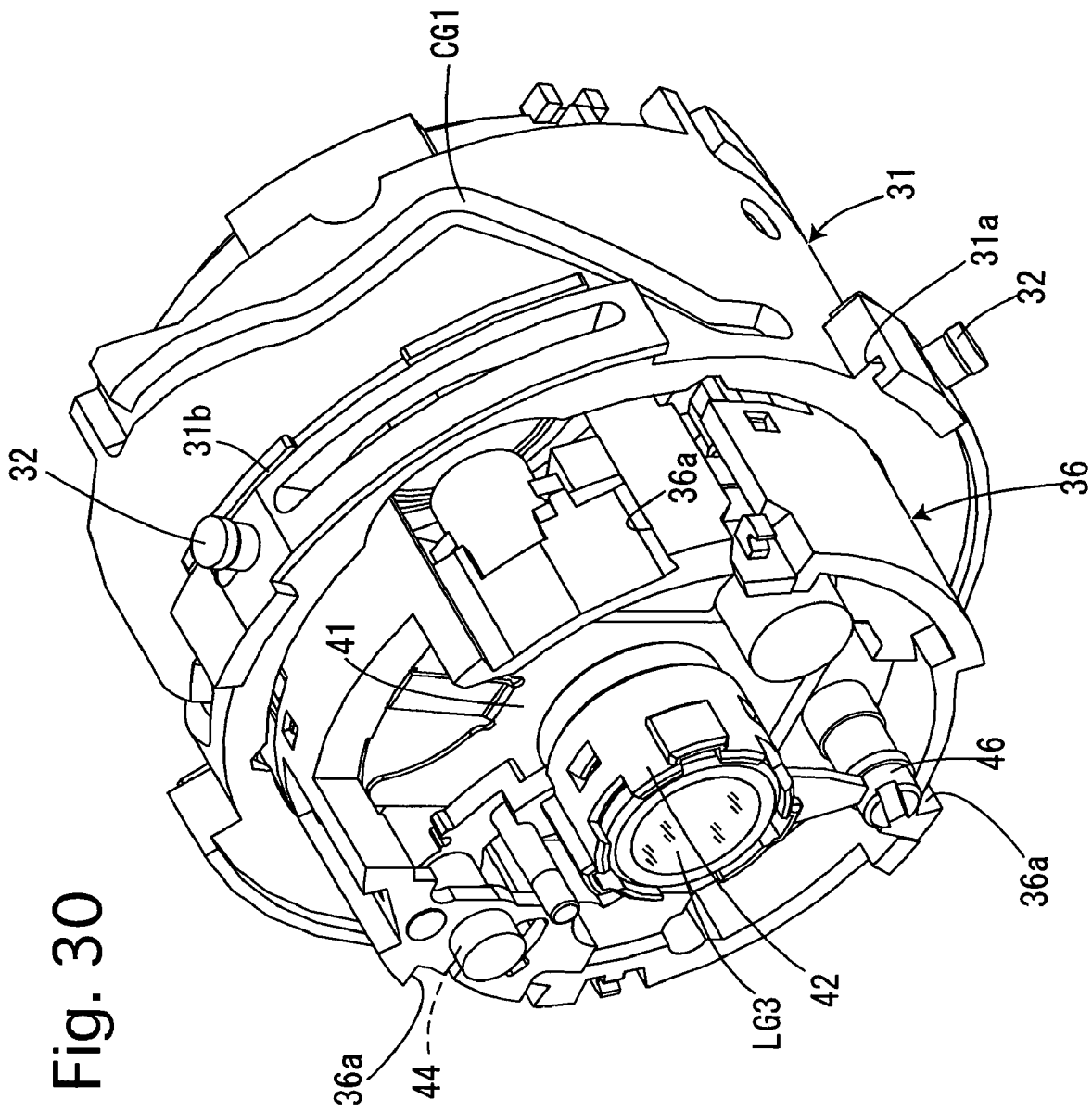
FIG. 30 is a perspective view of the cam ring, the third lens group moving frame and a third lens frame (radially-retractable lens frame) in a ready-to-photograph state of the zoom lens, viewed obliquely from behind.

The third lens frame 42 moves together with the third lens group moving frame 36 in the optical axis direction. As shown in FIGS. 5 and 29, the CCD holder 14 is provided on a front surface thereof with a position-control cam bar (retracting member/stationary cam bar) 49 which projects forward from the CCD holder 14 to be engageable with the third lens frame 42. If the third lens group moving frame 36 moves rearward in a retracting direction to approach the CCD holder 14, a retracting cam surface 49a (see FIG. 29) formed on a front end surface of the position-control cam bar 49 comes into contact with a specific portion of the third lens frame 42 to rotate the third lens frame 42 to the radially-retracted position. The position-control cam bar 49 is further provided along an inner side edge thereof with a radially-retracted-position holding surface 49b which extends rearward from the retracting cam surface 49a in a direction parallel to the photographing optical axis Z1.

Figure 12:
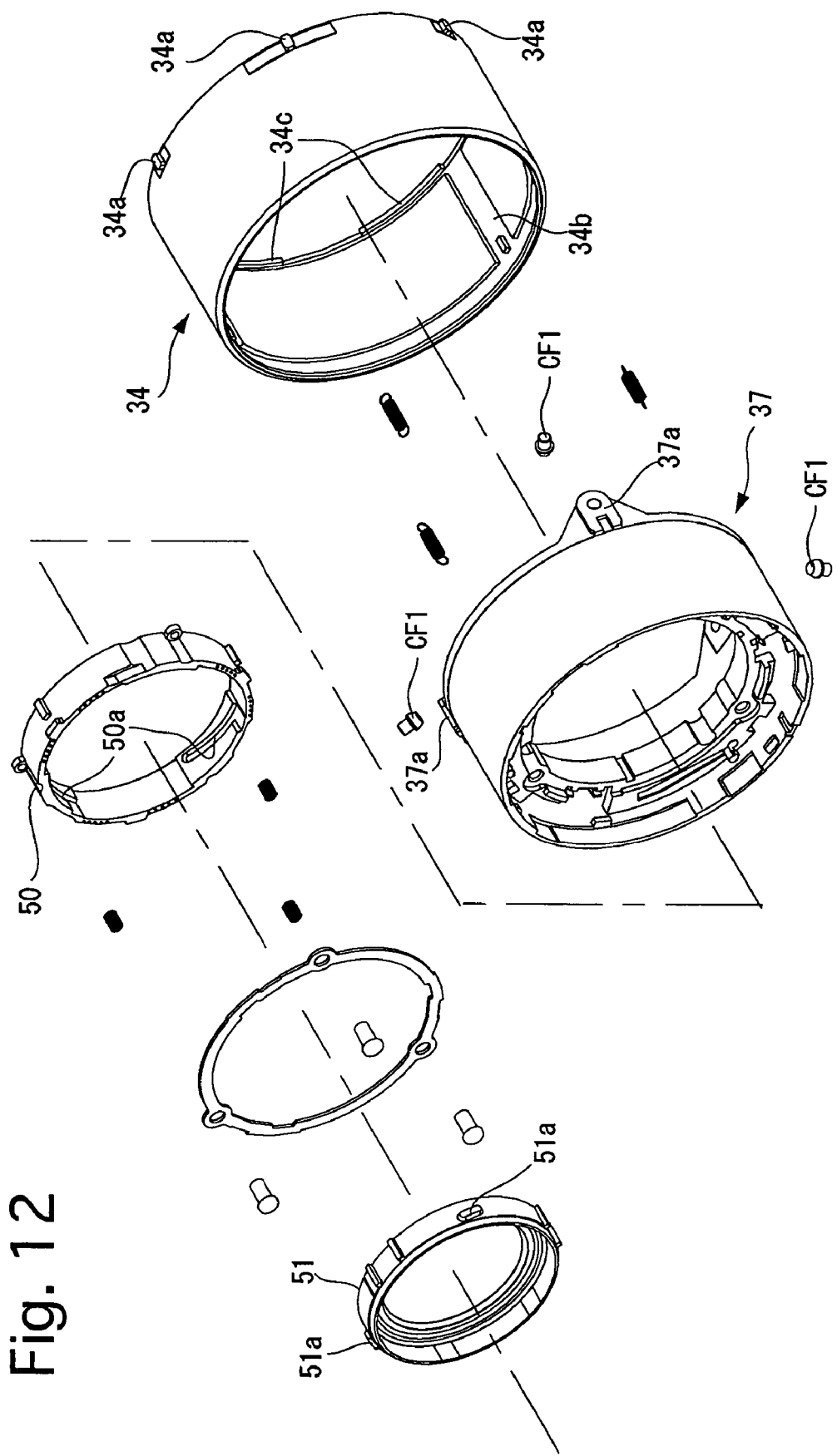
FIG. 12 is an exploded perspective view of a support structure that supports a first lens group.

As shown in FIG. 12, the second external barrel 34 is provided on an inner peripheral surface thereof with a set of three linear guide grooves 34b which are formed at different circumferential positions to extend parallel the photographing optical axis Z1. The first external barrel 37 is provided on an outer peripheral surface at the rear end thereof with a set of three engaging protrusions 37a which are slidably engaged in the set of three linear guide grooves 34b, respectively. Accordingly, the first external barrel 37 is guided linearly in the optical axis direction without rotating via the first linear guide ring 30 and the second external barrel 34. The second external barrel 34 is further provided on an inner peripheral surface thereof in the vicinity of the rear end of the second external barrel 34 with a discontinuous inner flange 34c which extends along a circumference of the second external barrel 34. The cam ring 31 is provided on an outer peripheral surface thereof with a discontinuous circumferential groove 31b in which the discontinuous inner flange 34c is slidably engaged so that the cam ring 31 is rotatable about the photographing optical axis Z1 relative to the second external barrel 34 and so that the second external barrel 34 is immovable in the optical axis direction relative to the cam ring 31 (i.e., the second external barrel 34 moves together with the cam ring 31 in the optical axis direction). On the other hand, the first external barrel 37 is provided on an inner peripheral surface thereof with a set of three cam followers CF1 which project radially inwards, and the cam ring 31 is provided on an outer peripheral surface thereof with a set of three outer cam grooves (third cam grooves) CG1 in which the set of three cam followers CF1 are slidably engaged, respectively.

The zoom lens 10 is provided inside of the first external barrel 37 with a first lens frame 51 which is supported by the first external barrel 37 via a first lens group adjustment ring 50. The first lens group LG1 is supported by the first lens frame 51 to be fixed thereto. The first lens frame 51 is provided on an outer peripheral surface thereof with a partial male screw thread 51a, and the first lens group adjustment ring 50 is provided on an inner peripheral surface thereof with a partial female screw thread 50a which is engaged with the male screw thread 51a (see FIG. 12). The position of the first lens frame 51 relative to the first lens group adjustment ring 50 in the optical axis direction can be adjusted during assembly of the zoom lens 10 via the partial male screw thread 51a and the partial female screw thread 50a.

The zoom lens 10 is provided at the front end of the first external barrel 37 with a lens barrier mechanism 54 (see FIG.

4) which automatically closes a front end aperture of the zoom lens 10 when the zoom lens 10 is retracted as shown in FIG. 3 to protect the frontmost lens element of the photographing optical system of the zoom lens 10, i.e. the first lens group LG1, from getting stains and scratches thereon when the digital camera is not in use. The lens barrier mechanism 54 is provided with a plurality of barrier blades (a front pair of barrier blades and a rear pair of barrier blades) 54a. The lens barrier mechanism 54 operates so that the plurality of barrier blades 54a are fully shut in front of the first lens group LG1 in the retracted state of the zoom lens 10 shown in FIG. 3, and are fully opened in a ready-to-photograph state of the zoom lens 10 shown in FIGS. 1 and 2.

A lens barrel advancing operation and a lens barrel retracting operation of the zoom lens 10 having the above described structure will be discussed hereinafter. In the state shown in FIG. 3, in which the zoom lens 10 is in the retracted state, rotating the zoom gear 22 in the lens barrel advancing direction by the zoom motor 23 causes a combination of the helicoid ring 25 and the third external barrel 26 to move forward while rotating due to the engagement of the female helicoid 13a with the male helicoid 25a, and further causes the first linear guide ring 30 to move forward linearly together with the helicoid ring 25 and the third external barrel 26. At this time, firstly the cam ring 31 does not rotate but only linearly moves forward together with the helicoid ring 25, the third external barrel 26 and the first linear guide ring 30, and subsequently torque is transferred to the cam ring 31 from the third external barrel 26 to move forward while rotating relative to the first linear guide ring 30 by the engagement of the set of roller followers 32 with the first lead slot portions 30e-2 of the set of through slots 30e after having been rotated by the aforementioned rotation of the combination of the helicoid ring 25 and the third external barrel 26 by an angle of approximately 30 degrees. Immediately after the helicoid ring 25 and the third external barrel 26 are extended forward to respective predetermined positions thereof, the male helicoid 25a of the helicoid ring 25 and the female helicoid 13a of the stationary barrel 13 are disengaged from each other, so that the helicoid ring 25 and the third external barrel 26 rotate about the photographing optical axis Z1 without moving in the optical axis direction due to the slidable engagement of the set of three rotational guide projections 25b with the set of three rotational guide grooves 13d. After a lapse of a predetermined period of time from the moment at which the helicoid ring 25 and the third external barrel 26 stop moving forward in the optical axis direction (i.e., the moment at which the set of three rotational guide projections 25b slide into the set of three rotational guide grooves 13d from the set of three inclined grooves 13c, respectively), the set of three roller followers 32 enter the second lead slot portion 30e-3 from the first lead slot portions 30e-2 of the set of three through slots 30e, respectively, so that the cam ring 31 is further moved forward while rotating relative to the first linear guide ring 30.

A rotation of the cam ring 31 causes each of the second lens group moving frame 35 and the third lens group moving frame 36, which are positioned inside of the cam ring 31 and guided linearly in the optical axis direction without rotating directly or indirectly by the second linear guide ring 33, to move in the optical axis direction with respect to the cam ring 31 in a predetermined moving manner due to the engagement of the set of front cam followers CF3 with the set of front inner cam grooves CG3 and the engagement of the set of rear cam followers CF2 with the set of rear inner cam grooves CG2, respectively. In the state shown in FIG. 3 in which the zoom lens 10 is in the retracted state, the third lens frame 42, which is provided in the third lens group moving frame 36, has rotated about the pivot shaft 44 to be held in the radially-retracted position above the photographing optical axis Z1 by the position-control cam bar 49, so that the optical axis of the third lens group LG3 is moved from the photographing optical axis Z1 to the retracted optical axis Z2 that is positioned above the photographing optical axis Z1. In the course of movement of the third lens group moving frame 36 from the retracted position to a position in the zooming range as shown in FIGS. 1, 2, 30 and 32, the third lens frame 42 is disengaged from the position-control cam bar 49 to rotate about the pivot shaft 44 from the radially-retracted position to the photographing position shown in FIGS. 1, 2, 30 and 32, where the optical axis of the third lens group LG3 coincides with the photographing optical axis Z1 by the sprig force of the torsion coil spring 47. Thereafter, the third lens frame 42 remains held in the photographing position until the zoom lens 10 is retracted to the position shown in FIG. 3.

Additionally, the rotation of the cam ring 31 causes the first external barrel 37, which is positioned around the cam ring 31 and guided linearly in the optical axis direction without rotating, to move in the optical axis direction relative to the cam ring 31 in a predetermined moving manner due to engagement of the set of three cam followers CF1 with the set of three outer cam grooves CG1, respectively.

Therefore, an axial position of the first lens group LG1 relative to the picture plane (a light-sensitive surface of the CCD image sensor 12) when the first lens group LG1 is moved forward from the retracted position is determined by the sum of the amount of forward movement of the cam ring 31 relative to the stationary barrel 13 and the amount of movement of the first external barrel 37 relative to the cam ring 31, an axial position of the second lens group LG2 relative to the picture plane when the second lens group LG2 is moved forward from the retracted position is determined by the sum of the amount of forward movement of the cam ring 31 relative to the stationary barrel 13 and the amount of movement of the second lens group moving frame 35 relative to the cam ring 31, and an axial position of the third lens group LG3 relative to the picture plane when the third lens group LG3 is moved forward from the retracted position is determined by the sum of the amount of forward movement of the cam ring 31 relative to the stationary barrel 13 and the amount of movement of the third lens group moving frame 36 relative to the cam ring 31. A zooming operation is carried out by moving the first, second and third lens groups LG1, LG2 and LG3 on the photographing optical axis Z1 while changing the distances therebetween. When the zoom lens 10 is driven to advance from the retracted position shown in FIG. 3, the zoom lens 10 firstly moves forward to the position shown in FIG. 1, in which the zoom lens 10 is set at wide-angle extremity. Subsequently, the zoom lens 10 moves forward to the position shown in FIG. 2, in which the zoom lens 10 is set at the telephoto extremity by a further rotation of the zoom motor 23 in a lens barrel advancing direction thereof. As can be seen from these sectional views of the zoom lens 10 shown in FIGS. 1 and 2, the distance between the first and second lens groups LG1 and LG2 is minimum and the distance between the second and third lens groups LG2 and LG3 is great when the zoom lens 10 is set at the wide-angle extremity. When the zoom lens 10 is set at the telephoto extremity, the distance between the first and second lens groups LG1 and LG2 is great and the distance between the second and third lens groups LG2 and LG3 is small. This variation of the distances among the first, second and third lens groups LG1, LG2 and LG3 for zooming operation is achieved by contours of the set of three outer cam grooves CG1, the set of three rear inner cam grooves CG2 and the set of three front inner cam grooves CG3. In the zooming range between the wide-angle extremity and the telephoto extremity, the helicoid ring 25 and the third external barrel 26 rotate without moving in the optical axis direction. On the other hand, in the same zooming range, the cam ring 31 moves forward and rearward in the optical axis direction while rotating due to the engagement of the set of three roller followers 32 with the second lead slot portions 30e-3 of the set of three through slots 30e of the first linear guide ring 30.

When the first through third lens groups LG1, LG2 and LG3 are in the zooming range, a focusing operation is carried out by moving the AF lens frame 17, which holds the fourth lens group LG4, along the photographing optical axis Z1 by rotation of the AF motor 19 in accordance with an object distance.

Driving the zoom motor 23 in a lens barrel retracting direction causes the zoom lens 10 to operate in the reverse manner to the above described advancing operation to retract the zoom lens 10 as shown in FIG. 3. In the course of this retracting movement of the zoom lens 10, the third lens frame 42 rotates about the pivot shaft 44 to the radially-retracted position by the position-control cam bar 49 while moving rearward together with the third lens group moving frame 36. When the zoom lens 10 is retracted to the retracted position shown in FIG. 3, the third lens group LG3 is retracted into the space radially outside of the space in which the fourth lens group LG4, the low-pass filter 11 and the CCD image sensor 12 are retracted as shown in FIG. 3, i.e., the third lens group LG3 is radially retracted into an axial range substantially identical to an axial range in the optical axis direction in which the fourth lens group LG4, the low-pass filter 11 and the CCD image sensor 12 are positioned. This structure of the zoom lens 10 for retracting the third lens group LG3 in this manner reduces the length of the zoom lens 10 when the zoom lens 10 is fully retracted, thus making it possible to reduce the thickness of the camera body in the horizontal direction as viewed in FIG. 3, i.e., in the optical axis direction.

Figure 21:
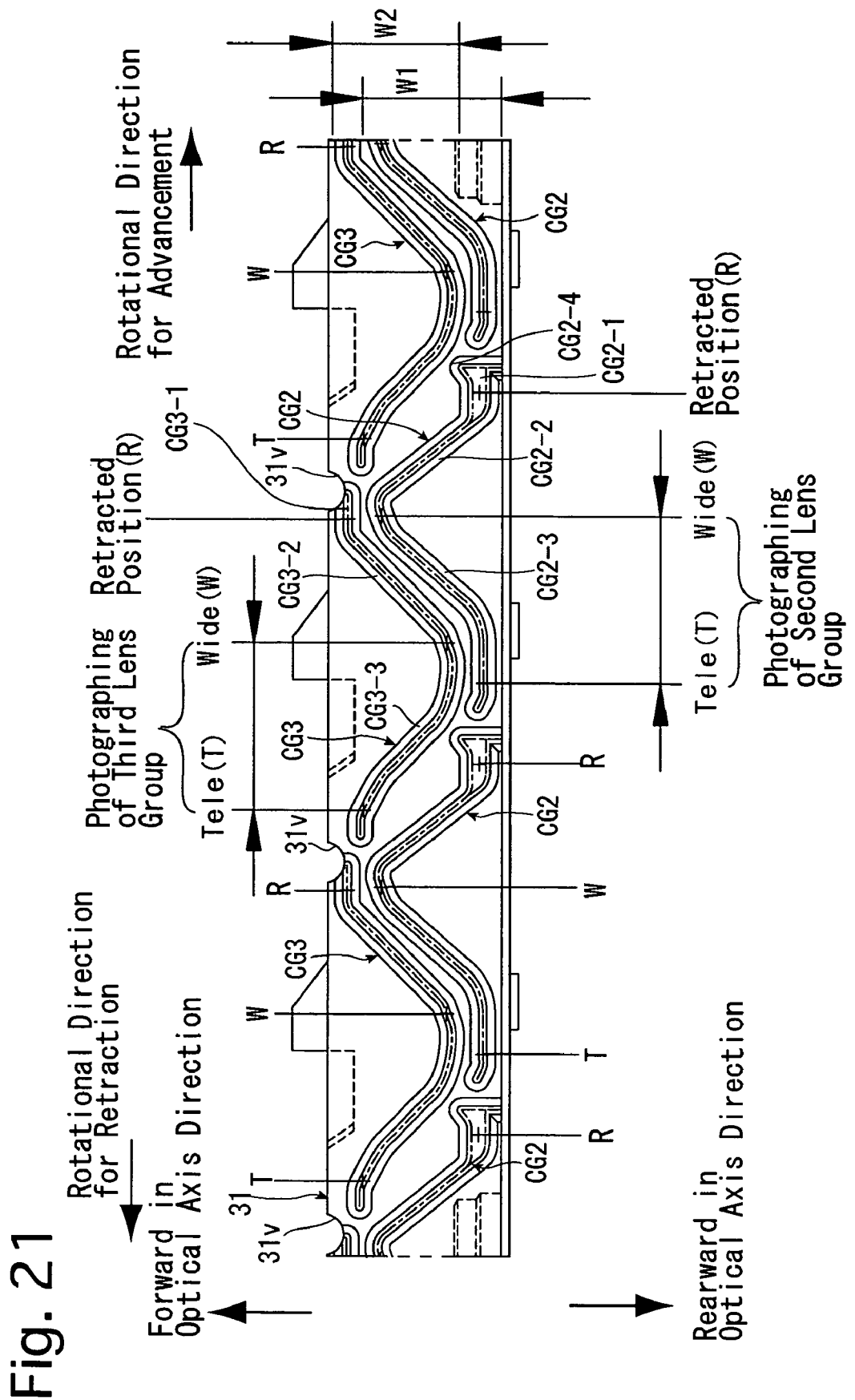
FIG. 21 is a developed view of the cam ring.

The cam mechanism, incorporated in the zoom lens 10, for moving the second lens group LG2 and the third lens group LG3 in the optical axis direction in a predetermined moving manner will be discussed in detail. FIGS. 21 and 25 through 28 show the shapes (contours) of the set of three rear inner cam grooves CG2 and the set of three front inner cam grooves CG3, which are elements of the cam mechanism. Although FIG. 21 is a developed view of the outer peripheral surface of the cam ring 31, the set of three rear inner cam grooves CG2 and the set of three front inner cam grooves CG3 that are formed on the inner peripheral surface of the cam ring 31 are shown by solid lines in FIG. 21 for the purpose of making the shapes of each cam groove easier to be seen. Additionally, although each of FIGS. 25 through 28 is a developed view of the outer peripheral surface of the cam ring 31, the second lens group moving frame 35 and the third lens group moving frame 36 are shown by solid lines in FIGS. 25 through 28 even though positioned radially inside of the cam ring 31. As can be seen in FIGS. 25 through 28, the set of three front inner cam grooves CG3 is positioned in front of the set of three rear inner cam grooves CG2 in the optical axis direction on the inner peripheral surface of the cam ring 31. Accordingly, the positional relationship in the optical axis direction between the second lens group LG2 and the third lens group LG3 is reverse to the positional relationship in the optical axis direction between the set of three rear inner cam grooves CG2, which is configured to move the second lens group LG2, and the set of three front inner cam grooves CG3, which is configured to move the third lens group LG3.

As shown in FIG. 21, each rear inner cam groove CG2 is provided at one end (rear end) thereof with an accommodation section CG2-1 which is wider than the remaining part of the rear inner cam groove CG2, and which is open on a rear end surface of the cam ring 31. Each rear inner cam groove CG2 is further provided with an inclined lead groove section CG2-2 which extends linearly obliquely from the accommodation section CG2-1 toward the front of the cam ring 31, and a return cam groove section CG2-3 which extends from the left end (left end as viewed in FIG. 21) of the inclined lead groove section CG2-2. Additionally, each rear inner cam groove CG2 is provided with a lens-barrel assembling section CG2-4 which projects forward from a front edge of the accommodation section CG2-1 in the optical axis direction. On the other hand, each front inner cam groove CG3 is provided with an accommodation section CG3-1 which extends in a circumferential direction of the cam ring 31, an inclined lead groove section CG3-2 which extends linearly obliquely from the accommodation section CG3-1 toward the rear of the cam ring 31, and a return cam groove section CG3-3 which extends from the left end (left end as viewed in FIG. 21) of the inclined lead groove section CG3-2. The cam ring 31 is provided on the front edge of the cam ring 31 with a set of three cutout portions 31v each having the shape of a semi-circle in cross section. The set of three cutout portions 31v are formed to be communicatively connected to one end (right ends as viewed in FIG. 21) of each of the accommodation sections CG3-1 of the set of three front inner cam grooves CG3, respectively, so that these one ends of the accommodation sections CG3-1 are open on the front edge of the cam ring 31. The set of three front cam followers CF3 are inserted into the set of three front inner cam grooves CG3 through the set of three cutout portions 31v, respectively.

Figure 26:
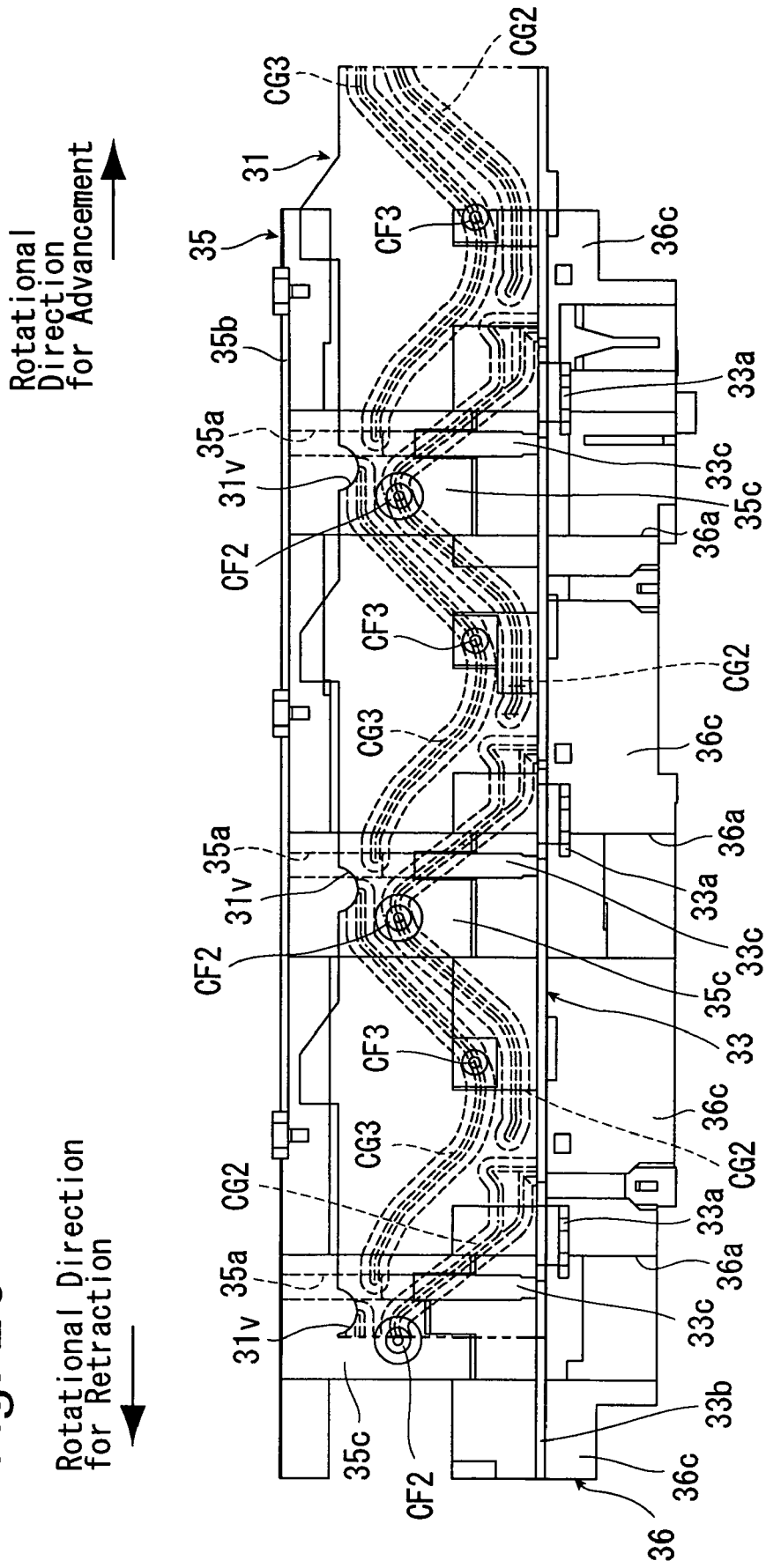
FIG. 26 is a developed view of the second lens group moving frame, the third lens group moving frame, the cam ring and the second linear guide ring, showing the positional relationship thereamong at the wide-angle extremity of the zoom lens.
Figure 27:
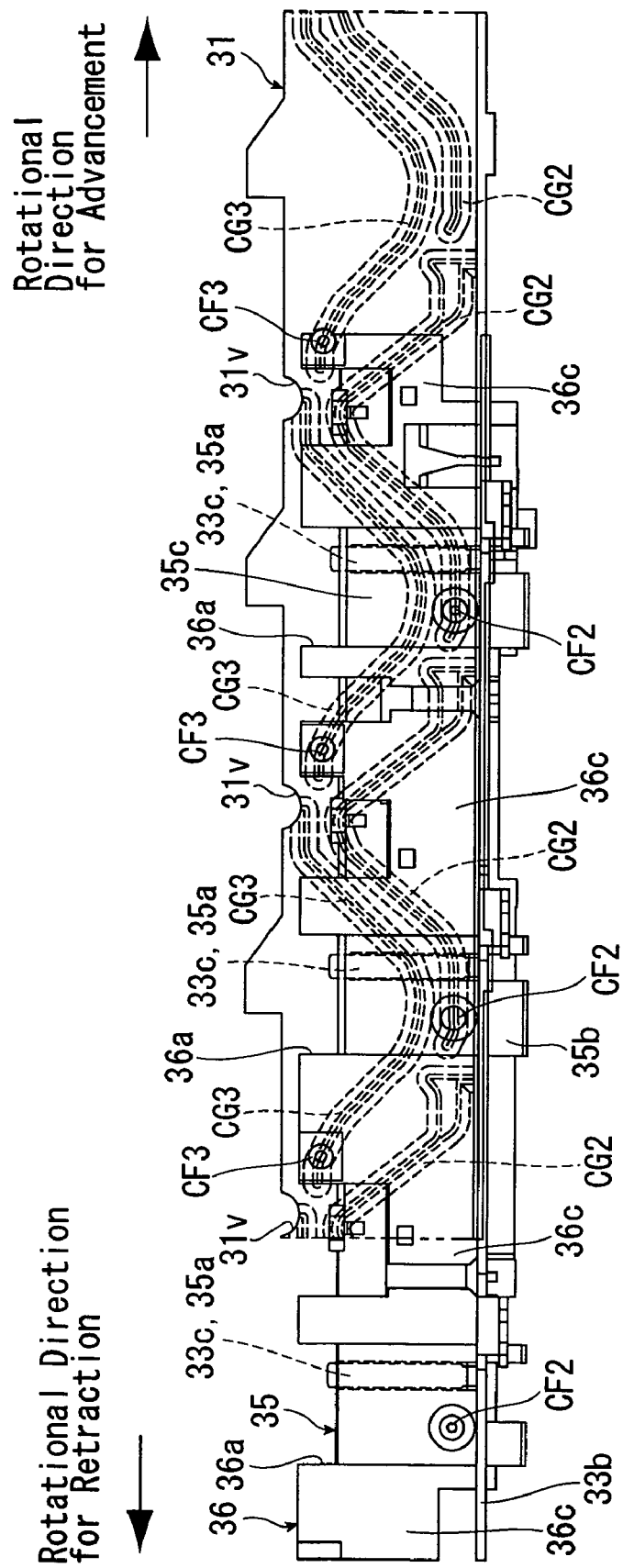
FIG. 27 is a developed view of the second lens group moving frame, the third lens group moving frame, the cam ring and the second linear guide ring, showing the positional relationship thereamong at the telephoto extremity of the zoom lens.

In each rear inner cam groove CG2, a specific portion thereof which is defined by the range between a wide-angle extremity position (W) and a telephoto extremity position (T) in FIG. 21 is used as a photographing range for performing a zooming operation. Likewise, in each front inner cam groove CG3, a specific portion thereof which is defined by the range between a wide-angle extremity position (W) and telephoto extremity position (T) in FIG. 21 is used as a photographing range for performing a zooming operation. When each rear cam follower CF2 and each front cam follower CF3 are positioned in the associated rear inner cam groove CG2 at the wide-angle extremity position (W) thereof and the associated front inner cam groove CG3 at the wide-angle extremity position (W) thereof as shown in FIG. 26, respectively, the zoom lens 10 is at the wide-angle extremity. When each rear cam follower CF2 and each front cam follower CF3 are positioned in the associated rear inner cam groove CG2 at the telephoto extremity position (T) thereof and the associated front inner cam groove CG3 at the telephoto extremity position (T) thereof as shown in FIG. 27, respectively, the zoom lens 10 is at the telephoto extremity. The distance between the second lens group LG2 and the third lens group LG3 is great and the amount of engagement (the amount of overlap) between the set of three rearward projections 35c of the second lens group moving frame 35 and the set of three linear guide grooves 36a of the third lens group moving frame 36 in the optical axis direction is small when the zoom lens 10 is at the wide-angle extremity (see FIGS. 8 and 26). On the other hand, the distance between the second lens group LG2 and the third lens group LG3 is small and the amount of engagement (the amount of overlap) between the set of three rearward projections 35c of the second lens group moving frame 35 and the set of three linear guide grooves 36a of the third lens group moving frame 36 in the optical axis direction is great when the zoom lens 10 is at the telephoto extremity (see FIGS. 9 and 27). In addition, when the zoom lens 10 is in the retracted state as shown in FIG. 3, each rear cam follower CF2 and each front cam follower CF3 are positioned in the accommodation section CG2-1 of the associated rear inner cam groove CG2 and the accommodation section CG3-1 of the associated front inner cam groove CG3, respectively (see FIG. 25).

The inclined lead groove section CG2-2 of each rear inner cam groove CG2 is inclined to the circumferential direction of the cam ring 31 to approach the front of the cam ring 31 in a direction away from the associated accommodation section CG2-1, while the return cam groove section CG2-3 of each rear inner cam groove CG2 is inclined to the circumferential direction of the cam ring 31 to approach the rear of the cam ring 31 in a direction away from the associated inclined lead groove section CG2-2. Conversely, the inclined lead groove section CG3-2 of each front inner cam groove CG3 is inclined to the circumferential direction of the cam ring 31 to approach the rear of the cam ring 31 in a direction away from the associated accommodation section CG3-1, while the return cam groove section CG3-3 of each front inner cam groove CG3 is inclined to the circumferential direction of the cam ring 31 to approach the front of the cam ring 31 in a direction away from the associated inclined lead groove section CG3-2. In other words, with respect to the development view of the cam ring 31 shown in FIG. 21, each rear inner cam groove CG2 is formed in a substantially inverted V shape having the apex thereof at the substantially center of the rear inner cam groove CG2, while each front inner cam groove CG3 is formed in a substantially V shape having the bottom thereof at the substantially center of the front inner cam groove CG3. The set of three rear inner cam grooves CG2 are arranged circumferentially at predetermined intervals while the set of three front inner cam groove CG3 are arranged circumferentially at predetermined intervals in an interengaged manner in the optical axis direction, with the position of the set of three rear inner cam grooves CG2 and the position of the set of three front inner cam grooves CG3 deviating from each other in the circumferential direction of the cam ring 31 (specifically, the position of the set of three rear cam followers CF2 and the position of the set of three front cam followers CF3 deviate from each other in the circumferential direction of the cam ring 31). This pattern of the cam grooves CG2 and CG3 on the cam ring 31 makes it possible to reduce the space between the set of three rear inner cam grooves CG2 and the set of three front inner cam grooves CG3 in the optical axis direction, thus making it possible to reduce the length of the cam ring 31 in the optical axis direction. In the present embodiment of the cam mechanism, the set of three front inner cam grooves CG3 are arranged at equi-angular intervals in the circumferential direction of the cam ring 31 while the set of three rear cam followers CF2 are arranged at equi-angular intervals in the circumferential direction of the cam ring 31 so that the portion of each rear inner cam groove CG2 at the wide-angle extremity position (W) substantially corresponds to the accommodation section CG3-1 of the associated front inner cam groove CG3 in the circumferential direction of the cam ring 31. This positional relationship between the set of three rear inner cam grooves CG2 and the set of three front inner cam grooves CG3 makes it possible for the set of three rear inner cam grooves CG2 and the set of three front inner cam grooves CG3 to be formed closely to each other in the optical axis direction without intersecting each other. Consequently, the length of the cam ring 31 in the optical axis direction is much smaller than the sum of a width W1 (see FIG. 21) of the set of three rear inner cam grooves CG2 and a width W2 (see FIG. 21) of the set of three front inner cam grooves CG3 in the optical axis direction.

Although each rear inner cam groove CG2 and each front inner cam groove CG3 have cam diagrams having the above described inverted V shape and the above described V shape, respectively, neither the inverted V-shaped cam diagram nor the V-shaped cam diagram has a symmetrical shape. Therefore, in the case where the set of three rear inner cam grooves CG2 and the set of three front inner cam grooves CG3 are formed on the cam ring 31 so that the set of three rear inner cam grooves CG2 are positioned in front of the set of three front inner cam grooves CG3 in the optical axis direction in the reverse fashion to the above described embodiment of the cam mechanism, such a front set of three cam grooves and such a rear set of three cam grooves would intersect each other on the same peripheral area of the cam ring 31 (within the same range in the optical axis direction) even if the position of the set of three rear inner cam grooves and the position of the set of three front inner cam grooves are adjusted in the circumferential direction of the cam ring 31. As described above, a single cam ring provided on an inner or outer peripheral surface thereof with two sets of cam grooves for moving two linearly guided optical elements needs to prevent the associated two sets of cam followers that are respectively engaged in the two sets of cam grooves from being disengaged therefrom at points of intersection of the two sets of cam grooves; however, taking such measures is liable to complicate the cam mechanism. For instance, one known solution to such a problem is to provide the cam ring with an auxiliary cam grooves having the same cam diagraphs as the main cam grooves to prevent the two sets of cam followers from being disengaged from the associated two sets of cam grooves. However, to form such auxiliary cam grooves in addition to the main cam grooves, it is necessary to secure an additional area on the cam ring in which the auxiliary cam grooves are formed, and accordingly, the cam ring increases in size. Conversely, in the present invention, the positions between the set of three rear inner cam grooves CG2 and the set of three front inner cam grooves CG3 in the optical axis direction have been changed without regard for the positions of lens groups in the optical axis direction, which are guided linearly in the optical axis direction (the second lens group LG2 and the third lens group LG3 in the above described embodiment of the zoom lens), which makes it possible for the set of three rear inner cam grooves CG2 and the set of three front inner cam grooves CG3 to be formed on the inner peripheral surface of the cam ring 31 while being prevented from intersecting each other with no increase in size of the cam ring 31.

Since each rear cam follower CF2 for moving the second lens group LG2 and each front cam follower CF3 for moving the third lens group LG3 are engaged in the associated rear inner cam groove CG2 and the associated front inner cam groove CG3 that are positioned in the reverse fashion as described above, there have been various design ideas applied to this arrangement and the assembling structure of the set of three rear cam followers CF2 and the set of three front cam followers CF3. Specifically, the set of three rear cam followers CF2 are formed on outer peripheral surfaces of the set of three rearward projections 35c that project rearward from the ring portion 35b of the second lens group moving frame 35, and the set of three front cam followers CF3 are formed on outer peripheral surfaces of three of the six forward projections 36c that project forward from the ring portion 36c of the third lens group moving frame 36. Moreover, the set of three rear cam followers CF2 are formed integral with the set of three rearward projections 35c. Furthermore, the set of three front cam followers CF3 are elements separate from the third lens group moving frame 36, and the third lens group moving frame 36 is provided, on the associated three of the six forward projections 36c in the vicinity of front end thereof, with three follower fixing holes 36v (see FIG. 11) in which the set of three front cam followers CF3 are inserted to be fixed thereto.

As for the second lens group moving frame 35 and the third lens group moving frame 36, the positions between the ring portion 35b, which supports the second lens group LG2, and the ring portion 36b, which supports the third lens group LG3, in the optical axis direction cannot be changed, whereas the positions between the set of three rear cam followers CF2 and the set of three front cam followers CF3 in the optical axis direction, which are respectively provided on the set of three rearward projections 35c and the specific three of the six forward projections 36c that are slidably movable relative to each other in the optical axis direction, can be freely changed without interfering with each other. Therefore, the set of three rear cam followers CF2 and the set of three front cam followers CF3 can be engaged in the set of three rear inner cam grooves CG2 and the set of three front inner cam grooves CG3 (the positions therebetween in the optical axis direction have been changed), respectively, without interference. The positional relationship between the positions between the set of three rear cam followers CF2 and the set of three front cam followers CF3 in the optical axis direction is determined by the cam diagrams of the set of three rear inner cam grooves CG2 and the set of three front inner cam grooves CG3, and the set of three front cam followers CF3 are not always positioned in front of the set of three rear cam followers CF2 in the cam ring 31. For instance, the set of three front cam followers CF3 are positioned in front of the set of three rear cam followers CF2 in the optical axis direction to correspond to the positional relationship between the set of three rear inner cam grooves CG2 and the set of three front inner cam grooves CG3 in the state shown in FIG. 25 in which the zoom lens 10 is in the retracted state and also in the state shown in FIG. 27 in which the zoom lens 10 is at the telephoto extremity, whereas the set of three rear cam followers CF2 are positioned in front of the set of three front cam followers CF3 in the optical axis direction in the state shown in FIG. 26 in which the zoom lens 10 is at the wide-angle extremity.

Figure 28:
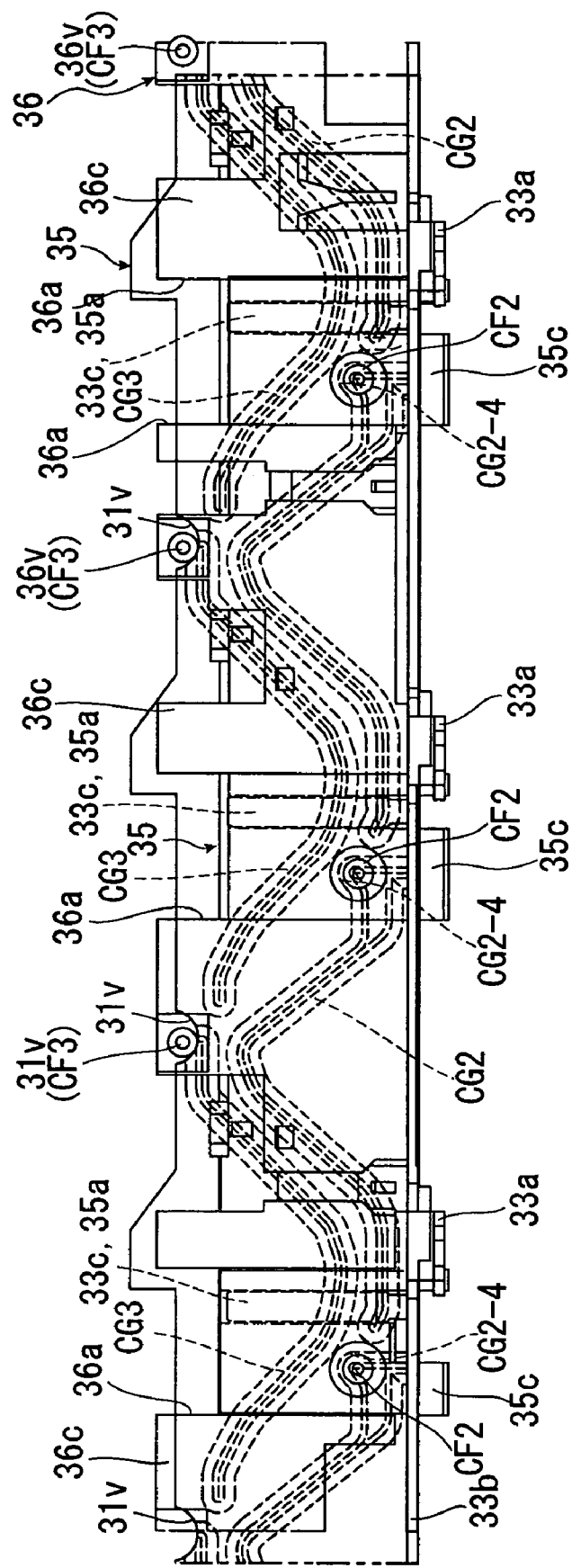
FIG. 28 is a developed view of the second lens group moving frame, the third lens group moving frame, the cam ring and the second linear guide ring, showing a state in which the second lens group moving frame and the third lens group moving frame are in the process of being installed into the cam ring during assembly.

A manner of installing the second lens group moving frame 35 and the third lens group moving frame 36 to the cam ring 31 during assembly of the zoom lens 10 will be discussed hereinafter. Firstly, the second lens frame 40 is fixed to the second lens group moving frame 35, and the shutter block 41 and the third lens frame 42 are fixed to the third lens group moving frame 36. Thereafter, the set of three rearward projections 35c and the set of six forward projections 36c are engaged with each other to unitize the second lens group moving frame 35 and the third lens group moving frame 36 (see FIG. 7). In this unitized state, the second lens group moving frame 35 and the third lens group moving frame 36 are guided linearly in the optical axis direction relative to each other due to the slidable engagement of the set of three rearward projections 35c with the set of six forward projections 36c. Subsequently, this unit of the second lens group moving frame 35 and the third lens group moving frame 36 is inserted into the cam ring 31 from the rear end thereof. At this stage, the set of three front cam followers CF3 are not yet installed to the third lens group moving frame 36. The set of three rear cam followers CF2 are inserted into the set of three rear inner cam grooves CG2, respectively, through the respective openings thereof that are formed on a rear end surface of the cam ring 31. Subsequently, the second lens group moving frame 35 and the third lens group moving frame 36 are pushed forward as an integral unit into the cam ring 31 so that the set of three rear cam followers CF2 enter the lens-barrel assembling sections CG2-4 of the set of three rear inner cam grooves CG2, respectively. Thereupon, the three follower fixing holes 36v, which are formed on three of the six forward projections 36c, are exposed radially outwards from the cam ring 31 through the set of three cutout portions 31v of the cam ring 31, respectively, as shown in FIG. 28. At this stage, the set of three front cam followers CF3 are installed into the three follower fixing holes 36v through the set of three cutout portions 31v, respectively. Subsequently, slightly rotating the cam ring 31 in a lens barrel advancing direction (rightward as viewed in FIG. 28) causes the second lens group moving frame 35 and the third lens group moving frame 36 to integrally move slightly rearward due to the relationship between the set of three rear cam followers CF2 and the second lens group LG2 (an inclined surface which connects the lens-barrel assembling section CG2-4 to the accommodation section CG2-1 in each rear inner cam groove CG2), and simultaneously causes the set of three front cam followers CF3 to move into the openings of the set of three front inner cam grooves CG3 from the set of three cutout portions 31v, respectively. Thereafter, upon the cam ring 31 being rotated to the position (retracted position) shown in FIG. 25, the set of three rear cam followers CF2 have moved away from the openings of the set of three rear inner cam grooves CG2 and reached the accommodation sections CG2-1 while the set of three front cam followers CF3 have moved away from the openings of the set of three front inner cam grooves CG3 and reached the accommodation sections CG3-1, so that the second lens group moving frame 35 and the third lens group moving frame 36 are supported by the cam ring 31 therein.

As can be understood from the above description, according to the present embodiment of the cam mechanism, the second lens group moving frame 35 and the third lens group moving frame 36 can be easily installed into the cam ring 31 that includes the set of three rear inner cam grooves CG2 (for moving the second lens group LG2 in the optical axis direction) and the set of three front inner cam grooves CG3 (for moving the third lens group LG3 in the optical axis direction), which are formed on the cam ring 31 so that the set of three front inner cam grooves CG3 are positioned in front of the set of three rear inner cam grooves CG2 though the third lens group LG3 that is moved in the optical axis direction by the set of three front inner cam grooves CG3 is positioned behind the second lens group LG2 that is moved in the optical axis direction by the set of three rear inner cam grooves CG2.

Although the above discussion has been addressed to the above described embodiment of the zoom lens, the present invention is not limited solely to this particular embodiment. For instance, the number of the above described four sets of cam grooves or followers (i.e., the set of three rear inner cam grooves CG2, the set of three front inner cam grooves CG3, the set of three rear cam followers CF2 and the set of three front cam followers CF3) is three in the above described embodiment of the zoom lens, but can be more than three or less than three.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A cam mechanism of a zoom lens which includes a front optical element and a rear optical element positioned behind said front optical element in an optical axis direction, said front optical element and said rear optical element being guided linearly in said optical axis direction, said cam mechanism comprising:

a cam ring having a first cam groove, for moving said front optical element in said optical axis direction, and a second cam groove, for moving said rear optical element in said optical axis direction, both said first cam groove and said second cam groove being formed on one of an inner peripheral surface and an outer peripheral surface of said cam ring, wherein said first cam groove is positioned behind said second cam groove in said optical axis direction.

2. The cam mechanism according to claim 1, wherein said first cam groove and said second cam groove are formed on said inner peripheral surface of said cam ring, said cam mechanism further comprising:

a front optical element support frame and a rear optical element support frame which support said front optical element and said rear optical element, respectively, and are guided linearly in said optical axis direction; and a first cam follower and a second cam follower which are provided on said front optical element support frame and said rear optical element support frame are engaged in said first cam groove and said second cam groove, respectively.

3. The cam mechanism according to claim 2, wherein one of said first cam groove and said second cam groove comprises a front follower-insertion opening at a front end of said cam ring, and the other of said first cam groove and said second cam groove comprises a rear follower-insertion opening at a rear end of said cam ring, wherein one of said first cam follower and said second cam follower is formed integral with associated one of said front optical element support frame and said rear optical element support frame, and the other of said first cam follower and said second cam follower is formed as an element separate from associated the other of said front optical element support frame and said rear optical element support frame, and wherein, during assembly of said zoom lens, said front optical element support frame and said rear optical element support frame are coupled to each other to be guided linearly in said optical axis direction relative to each other while said one of said first cam follower and said second cam follower, which is formed integral with associated one of said front optical element support frame and said rear optical element support frame, is inserted into associated one of said first cam groove and said second cam groove through associated one of said front follower-insertion opening and said rear follower-insertion opening, and subsequently said other of said first cam follower and said second cam follower is inserted into associated the other of said first cam groove and said second cam groove through associated the other of said front follower-insertion opening and said rear follower-insertion opening after being installed to said associated other of said front optical element support frame and said rear optical element support frame.

4. The cam mechanism according to claim 3, wherein said front optical element support frame and said rear optical element support frame comprise a front linear guide portion and a rear linear guide portion, respectively, which are configured to guide said front optical element support frame and said rear optical element support frame linearly in said optical axis direction relative to each other, one of said front optical element support frame and said rear optical element support frame being guided linearly in said optical axis direction by a linear guide member provided independently of each of said front optical element support frame and said rear optical element support frame.

5. The cam mechanism according to claim 4, wherein said front optical element support frame and said rear optical element support frame comprise a front ring portion and a rear ring portion, respectively, which support said front optical element and said rear optical element, respectively, and which are positioned away from each other in said optical axis direction, and wherein said front linear guide portion and said rear linear guide portion include at least one rearward projection and at least one forward projection, respectively, which project in directions approaching each other in said optical axis direction.

6. The cam mechanism according to claim 3, wherein said one of said first cam groove and said second cam groove, into which said one of said first cam follower and said second cam follower that is formed integral with said associated one of said front optical element support frame and said rear optical element support frame is inserted, comprises a lens-barrel assembling section which is formed so as to be communicatively connected with said associated one of said front follower-insertion opening and said rear follower-insertion opening and aligned therewith in said optical axis direction, wherein, when said one of said first cam follower and said second cam follower, which is formed integral with said associated one of said front optical element support frame and said rear optical element support frame, is in said lens-barrel assembling section, said other of said first cam follower and said second cam follower is exposed radially outwards from said cam ring.

7. The cam mechanism according to claim 6, wherein said cam ring comprises at least one cutout portion through which said other of said first cam follower and said second cam follower is exposed radially outwards from said cam ring when said one of said first cam follower and said second cam follower is in said lens-barrel assembling section.

8. The cam mechanism according to claim 2, wherein positions of said first cam follower and said second cam follower in a circumferential direction of said cam ring are mutually different when said first cam follower and said second cam follower are engaged in said first cam groove and said second cam groove, respectively.

9. The cam mechanism according to claim 1, wherein said first cam groove comprises at least two first cam grooves arranged at different positions in a circumferential direction of said cam ring, wherein said second cam groove comprises at least two second cam grooves arranged at different positions in said circumferential direction of said cam ring, and wherein each of said two first cam grooves and said two second cam grooves does not intersect any other cam groove of said two first cam grooves and said two second cam grooves.

10. The cam mechanism according to claim 1, wherein said front optical element and said rear optical element comprise a second lens group and a third lens group, respectively, of a photographing optical system of said zoom lens.

11. The cam mechanism according to claim 1, wherein said first cam groove and said second cam groove are formed on one of said inner peripheral surface and said outer peripheral surface of said cam ring, wherein said zoom lens further includes a frontmost optical element positioned in front of said front optical element in said optical axis direction, and wherein a third cam groove for moving said frontmost optical element in said optical axis direction is formed on the other of said inner peripheral surface and said outer peripheral surface of said cam ring.

12. The cam mechanism according to claim 1, wherein one and the other of said first cam groove and said second cam groove have a substantially V-shaped cam groove and a substantially inverted V-shaped cam groove, respectively.

13. A lens system including a front optical element and a rear optical element which are guided linearly in said optical axis direction,
  wherein said lens system includes a cam mechanism for moving said front optical element and said rear optical element in said optical axis direction while changing a distance therebetween in a predetermined moving manner,
  wherein said cam mechanism includes a cam ring having a first cam groove for moving said front optical element in said optical axis direction and a second cam groove for moving said rear optical element in said optical axis direction, both said first cam groove and said second cam groove being formed on one of an inner peripheral surface and an outer peripheral surface of said cam ring, and
  wherein said first cam groove is positioned behind said second cam groove in said optical axis direction.

* * * * *